(12) United States Patent
Cohen et al.

(10) Patent No.: US 11,861,450 B2
(45) Date of Patent: ***Jan. 2, 2024

(54) MULTIPLEXED QUICK RESPONSE ("QR") CODE EXPERIENCE DERIVATION

(71) Applicant: The DTX Company, New York, NY (US)

(72) Inventors: Neil Wayne Cohen, Oakton, VA (US); Timothy J. Lemmon, New York, NY (US); David Shing, Brookhaven, NY (US); Andrew Duplessie, New York, NY (US); Patrik Andrew Devlin, New York, NY (US)

(73) Assignee: the dtx company, New York, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/987,042

(22) Filed: Nov. 15, 2022

(65) Prior Publication Data

US 2023/0077182 A1 Mar. 9, 2023

Related U.S. Application Data

(63) Continuation of application No. 17/140,843, filed on Jan. 4, 2021.

(51) Int. Cl.
*G06K 7/14* (2006.01)
*H04L 9/08* (2006.01)
*G06F 21/56* (2013.01)

(52) U.S. Cl.
CPC .......... *G06K 7/1417* (2013.01); *G06F 21/56* (2013.01); *H04L 9/0861* (2013.01); *G06F 2221/034* (2013.01)

(58) Field of Classification Search
CPC . G06K 7/1417; G06F 21/56; G06F 2221/034; H04L 9/0861
See application file for complete search history.

(56) References Cited

U.S. PATENT DOCUMENTS 7,467,356 B2   12/2008   Gettman et al.
7,504,949 B1    3/2009   Rouaix et al.
(Continued)

OTHER PUBLICATIONS

Inderscience Enterprises Ltd., Wickramasinghe et al., "A Mathematical Model for Computational Aesthetics," pp. 310-324, 2010, Int. J. Computational Vision and Robotics, vol. 1, No. 3.
(Continued)

*Primary Examiner* — Matthew Mikels
(74) *Attorney, Agent, or Firm* — Weiss & Arons LLP

(57) ABSTRACT

An optical code scanner being operated using an algorithm is provided. The scanner may scan an optical label. The label may include machine-readable code. The scanner may derive a single set of instructions from the code or multiple sets of instructions from the code. The scanner may process the code. The processing may upload a set of instructions from the code to the scanner and store the set of instructions in an instructions library. The scanner may also derive a picture associated with the instructions and store the picture in the library. The scanner may display a plurality of pictures. Each of the pictures may correspond to a set of uploaded instructions stored on the scanner. Each of the plurality of pictures may be selectable by a user. In response to a user selection of a picture, the scanner may be configured to execute the uploaded instructions that correspond to the selected picture.

14 Claims, 20 Drawing Sheets

(56) References Cited

U.S. PATENT DOCUMENTS

| | | | |
|---|---|---|---|
| D697,529 S | 1/2014 | Judge Cornish | |
| D702,723 S | 4/2014 | Abratowski et al. | |
| D723,104 S | 2/2015 | Cho et al. | |
| 9,201,975 B2 | 12/2015 | Hall | |
| D769,296 S | 10/2016 | Grecia | |
| 9,704,081 B2 | 7/2017 | Tanaka et al. | |
| 9,936,249 B1 | 4/2018 | Nelson et al. | |
| D826,955 S | 8/2018 | Grecia | |
| D857,054 S | 8/2019 | Grecia | |
| 10,375,060 B1 | 8/2019 | Graves et al. | |
| D860,256 S | 9/2019 | Stephen | |
| 10,460,138 B2 | 10/2019 | Barnum | |
| 10,803,432 B1 | 10/2020 | Miles | |
| D905,743 S | 12/2020 | Jewitt | |
| 10,963,868 B1 | 3/2021 | McCauley et al. | |
| D918,936 S | 5/2021 | Walsh et al. | |
| 11,010,650 B1 | 5/2021 | Devlin et al. | |
| 11,106,753 B1 | 8/2021 | Fowler et al. | |
| 11,120,095 B2 | 9/2021 | Askarian et al. | |
| D936,699 S | 11/2021 | McDonald | |
| 11,182,768 B2 | 11/2021 | Fowler et al. | |
| D939,570 S | 12/2021 | Dye et al. | |
| 11,194,981 B2 | 12/2021 | Filter et al. | |
| 11,205,105 B1 | 12/2021 | Devlin et al. | |
| 11,206,432 B1 | 12/2021 | Fowler et al. | |
| 11,263,282 B2 | 3/2022 | Fowler et al. | |
| 11,334,779 B1 | 5/2022 | Schwarzberg | |
| 11,347,823 B2 | 5/2022 | Askarian et al. | |
| 2002/0032791 A1 | 3/2002 | Isherwood et al. | |
| 2002/0139839 A1 | 10/2002 | Catan | |
| 2004/0123223 A1 | 6/2004 | Halford | |
| 2004/0246529 A1 | 12/2004 | Pruden et al. | |
| 2006/0196950 A1 | 9/2006 | Kiliccote | |
| 2006/0215931 A1 | 9/2006 | Shimomukai | |
| 2007/0035327 A1 | 2/2007 | Baeckler et al. | |
| 2007/0286455 A1 | 12/2007 | Bradley | |
| 2009/0094175 A1 | 4/2009 | Provos et al. | |
| 2009/0240816 A1 | 9/2009 | Philyaw et al. | |
| 2010/0128921 A1 | 5/2010 | Alattar et al. | |
| 2011/0290882 A1 | 12/2011 | Gu et al. | |
| 2012/0016678 A1 | 1/2012 | Gruber et al. | |
| 2012/0206648 A1 | 8/2012 | Casagrande et al. | |
| 2012/0256732 A1 | 10/2012 | McAllister | |
| 2012/0278465 A1 | 11/2012 | Johnson | |
| 2013/0112760 A1 | 5/2013 | Schory et al. | |
| 2013/0197992 A1 | 8/2013 | Bao | |
| 2013/0215475 A1 | 8/2013 | Noguchi | |
| 2013/0228624 A1 | 9/2013 | Byrd et al. | |
| 2013/0297430 A1 | 11/2013 | Soergel | |
| 2014/0001253 A1 | 1/2014 | Smith | |
| 2014/0095461 A1 | 4/2014 | Burt | |
| 2015/0006702 A1 | 1/2015 | Lakes et al. | |
| 2015/0014417 A1 | 1/2015 | Finlow-Bates et al. | |
| 2015/0048169 A1 | 2/2015 | Doberschutz | |
| 2015/0099946 A1 | 4/2015 | Sahin | |
| 2015/0262221 A1 | 9/2015 | Nakano et al. | |
| 2015/0324678 A1 | 11/2015 | Simske et al. | |
| 2016/0063129 A1 | 3/2016 | Lim et al. | |
| 2016/0148083 A1 | 5/2016 | Osborne et al. | |
| 2016/0162767 A1 | 6/2016 | Ito et al. | |
| 2016/0189016 A1 | 6/2016 | Windmueller et al. | |
| 2016/0247423 A1 | 8/2016 | Hohl et al. | |
| 2016/0364825 A1 | 12/2016 | Pan | |
| 2017/0264608 A1 | 9/2017 | Moore et al. | |
| 2017/0300854 A1 | 10/2017 | Harcar et al. | |
| 2018/0365330 A1 | 12/2018 | Lin et al. | |
| 2019/0089757 A1 | 3/2019 | Sorensen et al. | |
| 2019/0138721 A1 | 5/2019 | Wojnowicz et al. | |
| 2019/0221293 A1 | 7/2019 | Zhang | |
| 2019/0234975 A1 | 8/2019 | Pothini et al. | |
| 2019/0258814 A1 | 8/2019 | Heeter | |
| 2019/0281030 A1 | 9/2019 | Isaacson et al. | |
| 2019/0281124 A1 | 9/2019 | Lim et al. | |
| 2020/0356080 A1 | 11/2020 | Principato | |
| 2020/0356083 A1 | 11/2020 | Principato | |
| 2020/0356741 A1 | 11/2020 | Principato | |
| 2020/0394699 A1 | 12/2020 | Mueller | |
| 2021/0042730 A1 | 2/2021 | Lee | |
| 2021/0271803 A1 | 9/2021 | Seymour et al. | |
| 2021/0287202 A1 | 9/2021 | Fowler et al. | |
| 2021/0334490 A1 | 10/2021 | Luk et al. | |
| 2021/0357715 A1 | 11/2021 | Schimke et al. | |
| 2022/0215190 A1* | 7/2022 | Cohen | G06K 19/06037 |
| 2022/0253811 A1 | 8/2022 | Fowler et al. | |
| 2022/0374664 A1 | 11/2022 | Zhou et al. | |

OTHER PUBLICATIONS

Elsevier, Maity et al., "A Computational Model to Predict Aesthetic Quality of Text Elements of GUI," pp. 152-159, 2016, Procedia Computer Science 84 (2016), www.sciencedirect.com.

AI Shack, Utkarsh Sinha, "Scanning QR Codes," 2010, https://aishack.in/tutorials/scanning-qr-codes-1/.

AIA Vision Online, "The Most Common Causes of Unreadable Barcodes," Apr. 15, 2015, https://www.visiononline.org/vision-resources-details.cfm?content id=5404.

Workwithcolor.com, "Color Properties/Terminology," Retrieved on Jun. 8, 2020, http://www.workwithcolor.com/color-properties-definitions-0101.htm,.

The Eurographics Association, Florian Hoenig, "Defining Computational Aesthetics," 2005, Computational Aesthetics in Graphics, Visualization and Imaging (2005), www.diglib.eg.org.

DataGenetics, "Wounded QR Codes," Nov. 2013, http://datagenetics.com/blog/november12013/index.html.

QR Code Monkey, "6 Reasons Why Your QR Code Is Not Working," Retrieved on Jun. 9, 2020, https://www.grcode-monkey.com/6-reasons-why-your-qr-code-is-not-working.

TechSpot, Inc., Mark Turner, "QR Codes Explained," Sep. 3, 2018, https://www.techspot.com/guides/1676-qr-code-explained/.

Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.

Thonky.com, "Module Placement in Matrix," Retrieved on Jun. 8, 2020, https://www.thonky.com/qr-code-tutorial/module-placement-matrix.

Keyence Corporation of America, "What Is a QR Code," Retrieved on Jun. 8, 2020, https://www.keyence.com/ss/products/auto_id/barcode_lecture/basic_2d/gr/.

Wikimedia Foundation, Inc., "QR Code," Retrieved on Jun. 3, 2020, https://en.wikipedia.org/wiki/QR_code.

Wikimedia Foundation, Inc., Walter Tuveli, "QR Code—Structure," 2012, https://en.wikipedia.org/wiki/QR_code#/media/File:QRCode-2-Structure.png.

Wikimedia Foundation, Inc., "ShotCode," Retrieved on Aug. 6, 2021, https://en.wikipedia.org/wiki/ShotCode#searchInput.

Medium.com, Punit Pathak, "ETL-Understanding It and Effectively Using It," Jan. 7, 2019, https://medium.com/hashmapinc/etl-understanding-it-and-effectively-using-it-f827a5b3e54d.

Strathmore University (Nairobi, Kenya), Kizi Dimira Othuon, "Improving Customer Experience Using an Android Barcode Reader Application," Apr. 2018, https://su-plus.strathmore.edu/bitstream/handle/11071/5978/Improving%20customer%20shopping%20experience%20using%20an%20Android%20barcode%20reader%20application.pdf?sequence=1&isAllowed=y.

Westboroughtv.org, Horrigan, Aidan, "Mr. WHS 2020," Jun. 12, 2020, https://westboroughtv.org/mr-whs-2020-2/.

Facebook.com, Wa, Izakaya, "QR codes for the dinner menu and lunch menu at Memorial!" Jul. 24, 2020, https://m.facebook.com/196433773873837/posts/qr-codes-for-the-dinner-menu-and-lunch-menu-at-memorial.1730306280486571.

Ispot.tv, "StockX TV Spot, 'Flowcode: Never Sold Out,'" Mar. 27, 2020, https://www.ispot.tv/ad/nVly/stockx-flowcode-never-sold-out.

Nyp.org, "#FitForTheFrontline Challenge Unites Nation's Top Medical Centers to Support Frontline Healthcare Workers," May 28, 2020, https://www.nyp.org/news/fit-for-the-frontline-challenge.

* cited by examiner

MULTIPLEXED QUICK RESPONSE ("QR") CODE EXPERIENCE DERIVATION

CROSS-REFERENCE TO RELATED APPLICATIONS

This application incorporates by reference herein co-pending, commonly-assigned, U.S. patent application Ser. No. 16/988,678, entitled, "MACHINE-READABLE LABEL GENERATOR", filed Aug. 9, 2020, in its entirety.

FIELD OF TECHNOLOGY

Aspects of the disclosure relate to technology for generating and scanning machine-readable optical labels such as quick-response ("QR") codes.

BACKGROUND

QR codes provide businesses with a fast and efficient medium for connecting with consumers. Instructions, such as Uniform Reference Locators ("URLs"), contact information and other information and computer-readable instructions may be encoded in QR codes. Businesses may leverage QR codes to guide consumers to a desired destination (real or virtual) where the customers can access products or services provided by the business. A scanning device is typically used to scan and interpret the instructions encoded in a QR code.

In 2010, 62.6 million people in the United States used smartphones. In 2020 that number is predicted to more than quadruple to 272.6 million. Commensurate with increased smartphone use is integration of technology into smartphones that scans and interprets QR codes. Today, many smartphones include a native camera application that can recognize QR codes. There is no need to download and install a separate QR reader application or use the separate QR reader to scan a QR code.

QR codes now offer an inexpensive means of providing many consumers with convenient access to products or services. Consumers are already using their smartphones to search for more information about a product/service of interest. Now, businesses can tap into this tendency by using QR codes to guide consumers to targeted content associated with a product/service. Furthermore, QR codes are inexpensive and easy to print on a variety of surfaces such as business cards, labels, product packaging, posters or marketing materials.

However, one hurdle still facing widespread adoption of QR codes is that the instructions encoded in a QR code must follow regimented protocols. The regimented protocols ensure that encoded instructions can be successfully scanned and interpreted by a smartphone. However, these protocols typically limit the amount of information that can be derived, extracted or decoded from a QR code.

Moreover, these protocols control the specifications and/or govern the operative capabilities of QR code scanners used to derive the information from the QR code. Current smartphones provide QR reader applications that potentially allow for more advanced scan responses than other readers. Current smartphones may be able to provide customized QR reader applications. Customized QR reader applications may be downloaded as a smartphone application. However, scanning responses are limited to the limited instructions provided in QR code.

It would be desirable to provide apparatus and methods for generating QR codes that promote configurable scanner specifications.

It would be even more desirable to provide a QR code that can provide a first instruction(s) to a scanner having a first configuration and a second instruction(s) to a second scanner having a second configuration.

It would be still more desirable to provide a QR code that, depending on the configuration of the scanner, provides more than one possible user experience for the same QR code—or for directly adjacent areas with instruction sets.

It would be even more desirable to provide a QR code with multiple regions, whereby each region represents a discrete instructions set.

It would also be desirable to provide a QR code that mines additional regions within a conventional QR code footprint that have, heretofore, been unused. Further to this aspect, it would be desirable to provide a discrete instruction set, or different instruction sets, that is located solely within one or more locations associated with the additional region or is located in a combination of the conventional QR code region in combination with the additional region.

SUMMARY OF THE DISCLOSURE

A method for scanning an optical label is provided. The optical label may include a primary optical label machine-readable code region and at least one secondary optical label machine-readable code region. The method may include activating a scanning application on an optical label scanner.

The method may also include retrieving information, using the scanning application activated on the optical label scanner, from the primary optical label machine-readable code region. The method may then include retrieving information, using the scanning application, from the at least one secondary optical label machine-readable code region. In some embodiments, the method, or methods, may include combining "public" information—i.e., information retrieved from a public-facing label—with "private/PIN" information—i.e., information derived from the scanner (and/or scanner user). Such information may determine one or more actions taken subsequent to the scan.

The primary optical label machine-readable code may preferably include a magnitude of an area that is greater than a magnitude of an area associated with the secondary optical label machine-readable code region.

The secondary optical label machine-readable code region or regions may include instructions that are different from instructions included the primary optical label machine-readable code region, but will preferably be within the field of view of the overall scanning application.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
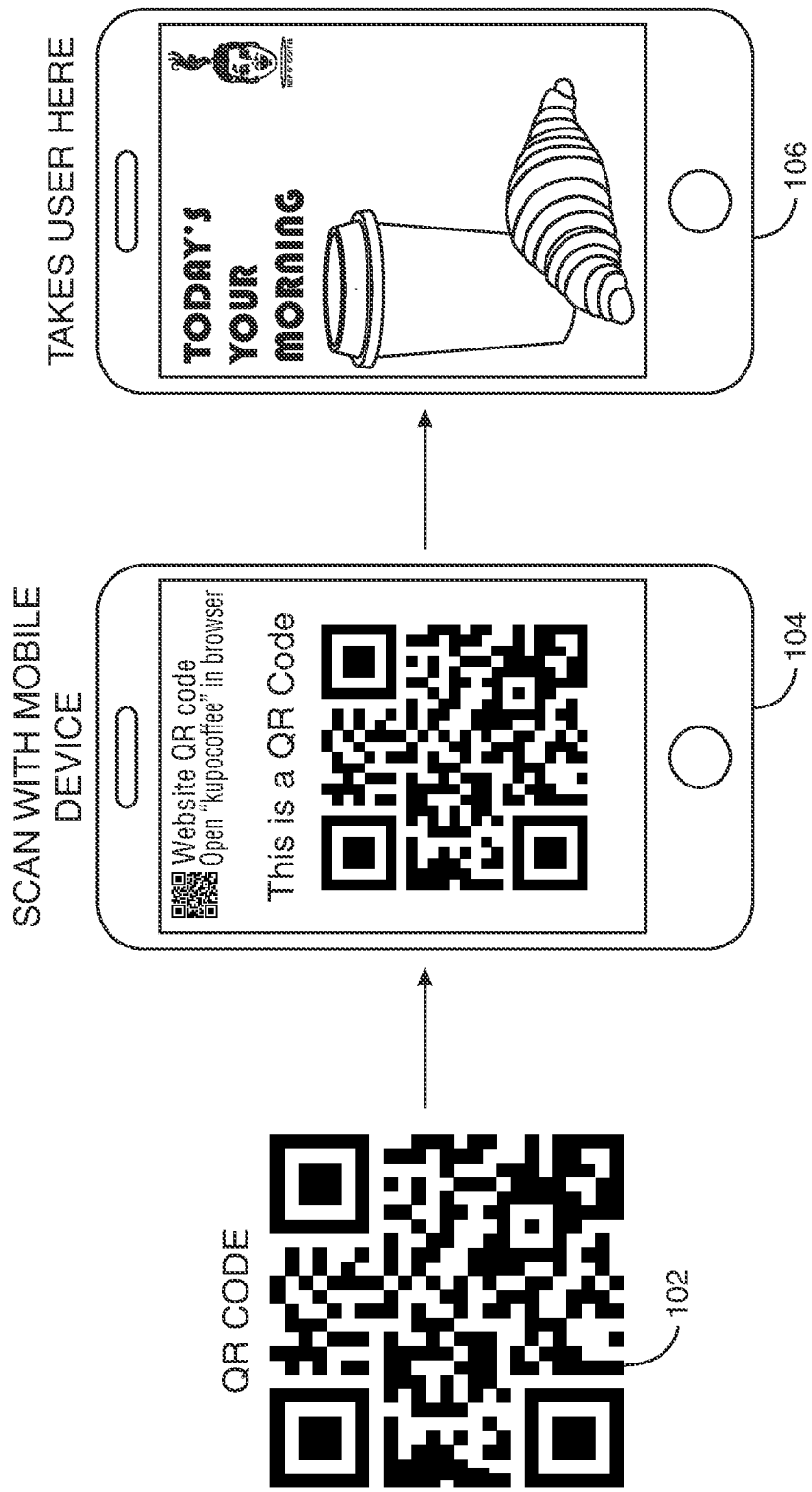
FIG. 1 shows a prior art illustration of a QR scan experience in accordance with the prior art.

A system for generating a machine-readable optical label is provided. An illustrative machine-readable optical label may be a quick-response ("QR") code. Other illustrative machine-readable optical labels may include a linear barcode or a two-dimensional matrix barcode such as Aztec code, ShotCode, SPARQCode, and the like.

The system may include a software dashboard. The dashboard may include a user interface ("UI") that provides access to software tools for entering one or more design choices for a machine-readable optical label, such as a QR code. An associated software engine may generate a machine-readable optical label based on the user entered design choices.

A machine-readable optical label may include a plurality of modules—i.e., areas within the code that are directed to pre-defined tasks and/or functions. A module may be a dark module or a light module, or modules with different colors, visible or in other spectra such as infrared or ultraviolet. A scanning device, such as a smartphone, may be configured to interpret instructions encoded by a pattern of light and dark modules. For example, the scanning device may interpret the pattern of modules as a binary encoded message. A light module may represent a 0, and a dark module may represent a 1, or vice versa.

A pattern of modules within a machine-readable optical label may define a data zone, position detection patterns, timing patterns, an error correction level and error correction code. The data zone may include machine readable instructions that, when scanned, triggers an action on a device used to scan the machine-readable optical label. For example, the machine-readable optical label may include instructions for launching a webpage or text message application. The instructions encoded in the data zone may prefill a destination field of the text message or insert text into the body of a message. The instructions encoded in the data zone may trigger a display of information on the scanning device such as a product identifier or instructions on how to use the product. The more information included within the data zone, the more modules a machine-readable optical label will have to encode that information.

Position detection patterns may provide instructions that orient a scanning device to identify and read the data zone. Position detection patterns may include position markers. For example, a machine-readable optical label may include three position markers ("eyes") at a top left, top right, and bottom left of the machine-readable optical label. Position markers may be defined based on a pattern of light/dark modules. For example, a position marker may be spaced apart from the data zone by a border of light modules. The position marker may include an outer border of dark modules. The outer border may surround an inner border of light modules. The inner border of light modules may surround a core of dark modules. A position mark may be designed to include a pattern of modules that is unlikely to appear elsewhere within the machine-readable optical label.

Each position marker may be linked to another position marker by a timing pattern. An illustrative timing pattern may include a horizontal line of alternating light/dark modules. An illustrative timing pattern may include a vertical line of alternating light/dark modules. Each line of alternating light/dark modules may start and end with a dark module.

The position detection pattern may include an alignment pattern. An alignment pattern may overlap a timing pattern. The alignment pattern may include one or more alignment markers. An illustrative alignment marker may include an outer border of dark modules surrounding an inner border of light modules and a single dark module in the center of the marker.

The alignment pattern may allow a scanning device to determine an orientation of the machine-readable optical label. The alignment pattern may improve scanning speed of the machine-readable optical label. The alignment pattern may include markers or a pattern that allows a scanning device to orient the machine-readable optical label despite displacement of modules due to distortion. For example, the alignment pattern may allow a device to scan machine-readable optical labels applied to a curved surface. Generally, a larger machine-readable optical label will include more alignment patterns than a smaller machine-readable optical label. Size of a machine-readable optical label may be defined based on a number of modules included in the machine-readable optical label.

The machine-readable optical label may include error correction code. The error correction code may be included in the data zone. An illustrative error correction code may include Reed-Solomon codes. The error correction code may be applied to restore data encoded by modules when a segment of a machine-readable optical label is missing or damaged. A machine-readable optical label may include various levels of error correction.

Modules used for error correction store redundant copies of data that compensate for damaged modules that cannot be read by a scanner. An exemplary target error correction level may allow restoration of at least 15% of data bytes. The target error correction level is determined based on Reed-Solomon codes included in the machine-readable optical label. Other illustrative target error correction levels may include:

Level L—7% of data bytes can be restored.
Level M—15% of data bytes can be restored.
Level Q—25% of data bytes can be restored.
Level H—30% of data bytes can be restored.

A machine-readable optical label that includes a 30% error correction level will be scannable by a device even if 30% of the modules are damaged (soiled, washed out, faded, replaced with images). Generally, the higher level of error correction included in the machine-readable optical label, the less instructions can be stored within a data zone of the machine-readable optical label.

An optical label according to the disclosure is provided. The label may include a primary optical label machine-readable code region. The primary optical label machine-readable code region may include a first area.

The optical label may also include a secondary optical label machine-readable code region. The secondary optical label machine-readable code region may include a second area. The first area may include a magnitude that is greater than a magnitude of the second area.

The primary optical label machine-readable code region may also include a first plurality of instructions that are different from a second plurality of instructions. The second plurality of instructions may be located in and/or derived from the secondary optical label machine-readable code region. In some embodiments, the first plurality of instructions, when processed in conjunction with the second plurality of instructions, may form a third plurality of instructions.

The magnitude of the primary area may in certain embodiments, be greater, by at least 30% of the magnitude of the primary area, than the magnitude of the secondary area.

In some embodiments, the first plurality of instructions may be configured, in response to a scanning and a processing of the instructions in the primary optical label machine-readable code region, to direct a scanner to a first URL (Uniform Resource Locator) or other suitable location. In addition, the second plurality of instructions may be configured, in response to a scanning and a processing of the instructions in the secondary optical label machine-readable code region, to direct the scanner to a second URL.

Certain embodiments may include a label that provides, in addition to the first and second plurality of instructions, a third plurality of instructions. The third plurality of instructions may, in some embodiments, be based on the first plurality of instructions and the second plurality of instructions. In other embodiments, the third plurality of instructions may be based on one of the first and second plurality of instructions. In yet other embodiments, the third plurality of instructions may be based on a region of code that is different from the first region of code, used to derive the first set of instructions, and different from the second region of code and to derive a second set of instructions. It should be noted as well that the third plurality of instructions may be configured to direct the scanner to a third URL or other suitable location. The third URL may be different from the first and second URLs identified above.

In certain embodiments, the secondary optical label machine-readable code region may be formed from a plurality of discrete regions. The plurality of discrete regions may substantially, if not completely, surround the primary optical label machine-readable code. Alternatively, the plurality of discrete regions may be distributed evenly or unevenly with respect to the primary code region, but not surround the primary code region.

In some embodiments of the invention, the label may contain, in addition to the primary and secondary regions, a tertiary optical label machine-readable code region. In some embodiments, the tertiary optical label machine-readable code region may form an external border around the primary optical label machine-readable code region. The tertiary optical label machine-readable code region may, in certain embodiments, form an external border around the secondary optical label machine-readable code region. The tertiary optical label machine-readable code region may, in certain embodiments, form an external border around the second plurality of discrete regions described above.

The embodiments set forth herein may involve an optical code scanner. The scanner may be operated using an algorithm. Elements of the algorithm are set forth hereinbelow as described in the context of the various configurations of the scanner.

The scanner may be configured to scan an optical label. For the purposes of this application an optical label may be understood to refer to any multi-dimensional construct that is capable of being retrieved and interpreted by, for example, an optical scanner. For example, the optical label may include machine-readable code that is set forth in the format of optical markings. The scanner may be used to process the code. The processing of the code may trigger an uploading of a set of instructions from the code to a safe zone within the scanner.

The processing may also include determining whether the set of instructions in the code includes malware—short for malicious software. Malware is an umbrella term used to refer to a variety of forms of hostile or intrusive software. Such hostile or intrusive software may include computer viruses, worms, Trojan horses, ransomware, spyware, adware, scareware, and other malicious programs. It can take the form of executable code, scripts, active content, and other software. Malware is defined by its malicious intent, acting against the requirements, or contrary to the interests, of the computer user. In response to a determination that the set of instructions includes malware, the processing of the code region may trigger termination of the uploading of the code.

Certain embodiments may include an optical code scanner. The scanner may be operated using an algorithm. The scanner may be configured to process the code stagewise. The stagewise processing of the code may include, in a first stage, initiating uploading a set of instructions from the code to the scanner.

In a second stage, the processing may include determining whether the set of instructions comprises a valid authorization instruction within the code. When the set of instructions is determined to comprise the valid authorization instruction, then a third stage may include enabling completion of the uploading of the code.

Some embodiments of the invention may include an optical code scanner being operated using an algorithm and configured as follows. The scanner may be configured to scan an optical label. The label may include optical label machine-readable code. The scanner may process the code. The processing may include uploading a set of instructions from the code to the scanner and storing the set of instructions in an instructions library. The scanner may also derive a picture associated with the instructions from the instructions stored within the library. The scanner may also maintain a clickable picture of the code for associating with the picture.

The scanner may be further configured to display a plurality of pictures. Each of the pictures may correspond to a set of uploaded instructions stored on the scanner.

In preferred embodiments, each of the plurality of pictures is selectable by a user. In response to a user selection of a picture, the scanner may be configured to execute the uploaded instructions that correspond to the selected picture.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a prior art illustration of a QR scan experience in accordance with the prior art. QR code 102 shows a conventional QR code. Element 104 indicates a mobile device and mobile device screen that have been used to scan QR code 102. Following the scan, QR code 102 appears on the screen of the mobile device.

Following the scan of QR code 102 and the processing of same by the mobile device, as shown at 104, element 106 indicates that the mobile device navigates the user to the website or other location identified by QR code 102.

Figure 2:
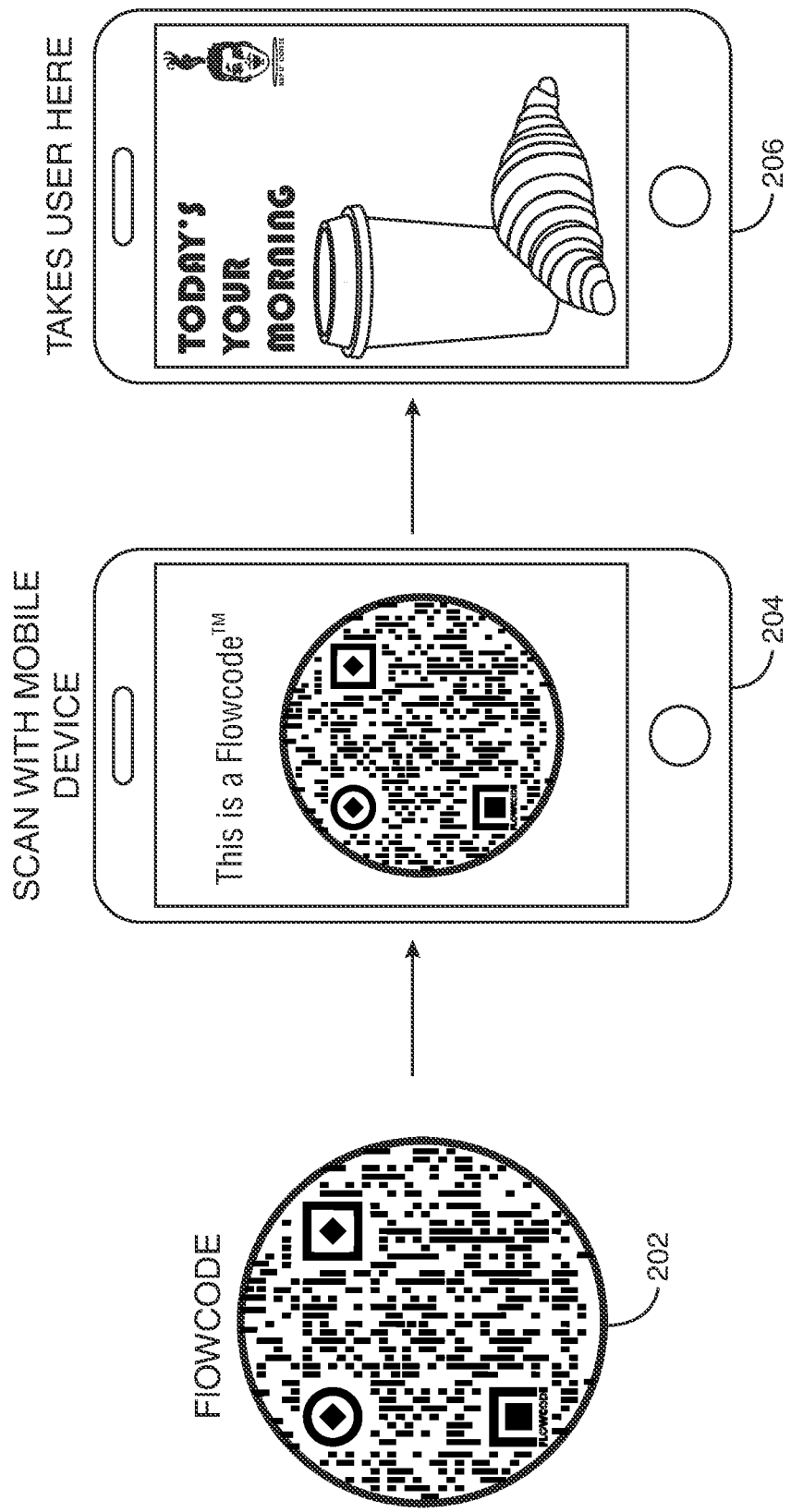
FIG. 2 shows a Flowcode™ scan experience in accordance with the principles of the disclosure.

FIG. 2 shows a Flowcode™ scan experience in accordance with the principles of the disclosure. Flowcode™ is shown at 202. It should be noted that Flowcode™ 202 may be understood to leverage a conventional QR code footprint within a greater code area, as described in more detail below with respect to FIG. 3.

Element 204 shows scanning the Flowcode™ 202 with a mobile device to retrieve and process same.

Thereafter, processing Flowcode™ 202 takes a user to a website 206 or other suitable location associated with Flowcode™ 202.

Figure 3:
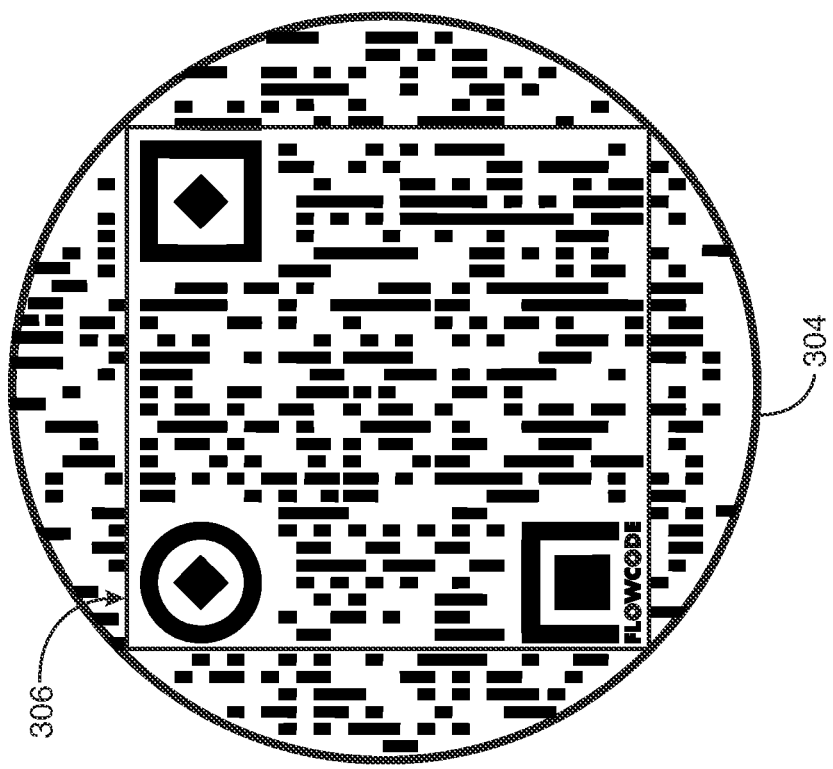
FIG. 3 shows yet another illustrative diagram in accordance with principles of the disclosure.
Figure 3:
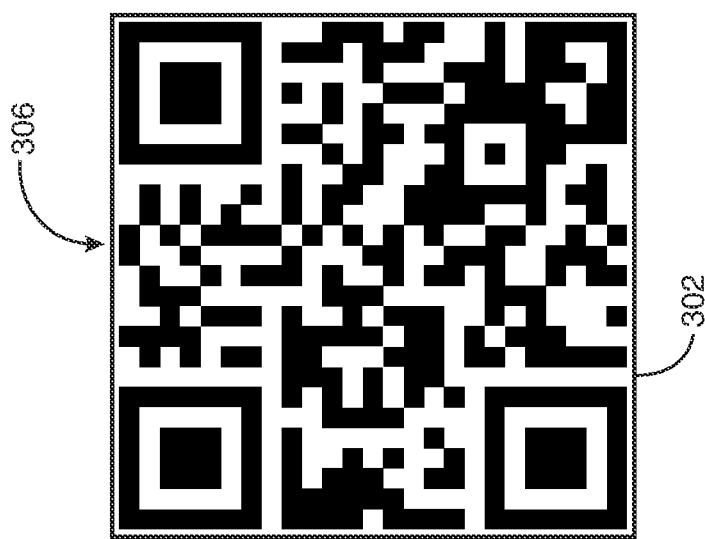

FIG. 3 shows yet another illustrative diagram in accordance with principles of the disclosure. FIG. 3 shows a conventional QR code 302 alongside a Flowcode™ 304. Each of conventional QR code 302 and Flowcode™ 304 shows the data zone as circumscribed by a square 306.

The area circumscribed by square 306 is typically reserved for the standard QR algorithm scan in the case of QR code 302 and the Flowcode™ algorithm scan in the case of Flowcode™ 304. It should be noted that use of the area surrounded by square 306 either by conventional QR code 302 or by Flowcode™ 304 precludes other uses of the surrounded area. Typically, such other uses interfere with the standard code-associated use of the area circumscribed by square 306.

Figure 4:
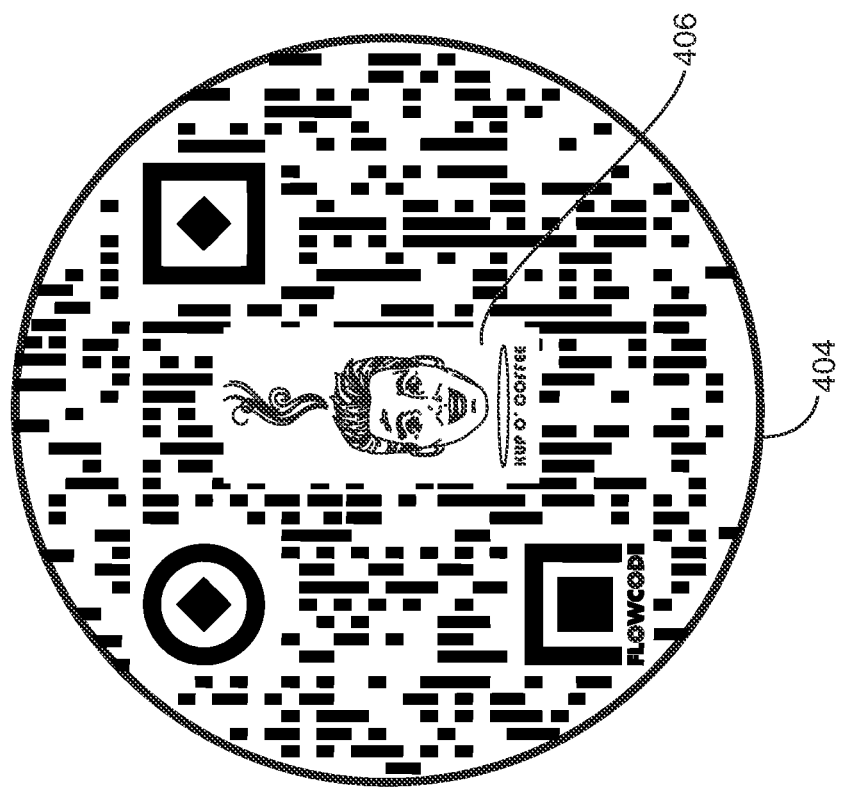
FIG. 4 shows an illustrative diagram in accordance with principles of the disclosure.
Figure 4:
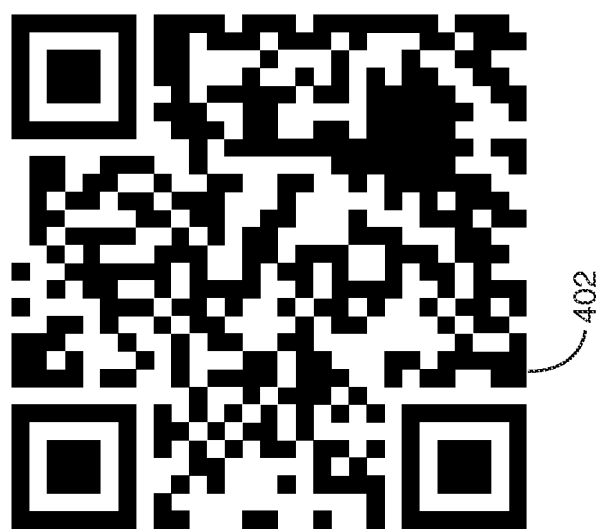

FIG. 4 shows an illustrative diagram in accordance with principles of the disclosure. FIG. 4 shows a conventional QR code 402 and a Flowcode™ 404 that is different from Flowcode™ 304 shown in FIG. 3.

Specifically, Flowcode™ 404 is different in that a portion of the area of Flowcode™ 404, within the area shown circumscribed by square 306 in FIG. 3, has been leveraged to include a company logo 406. It should be noted, as well, that an increase in the scannable area of Flowcode™ obtains yet greater advantages with respect to increased scannable information, greater efficiency of code retrieval and an increase of usable code area.

Figure 5:
FIG. 5 shows yet another illustrative diagram in accordance with principles of the disclosure.
Figure 5:

FIG. 5 shows yet another illustrative diagram in accordance with principles of the disclosure. FIG. 5 shows that the optimum scanner seeks an exclusively scannable area. To optimize brand information, however, the scannable area should be reduced to zero and only brand information should be displayed. This option, however, is unworkable at least because a brand contains no scannable information.

Figure 6:
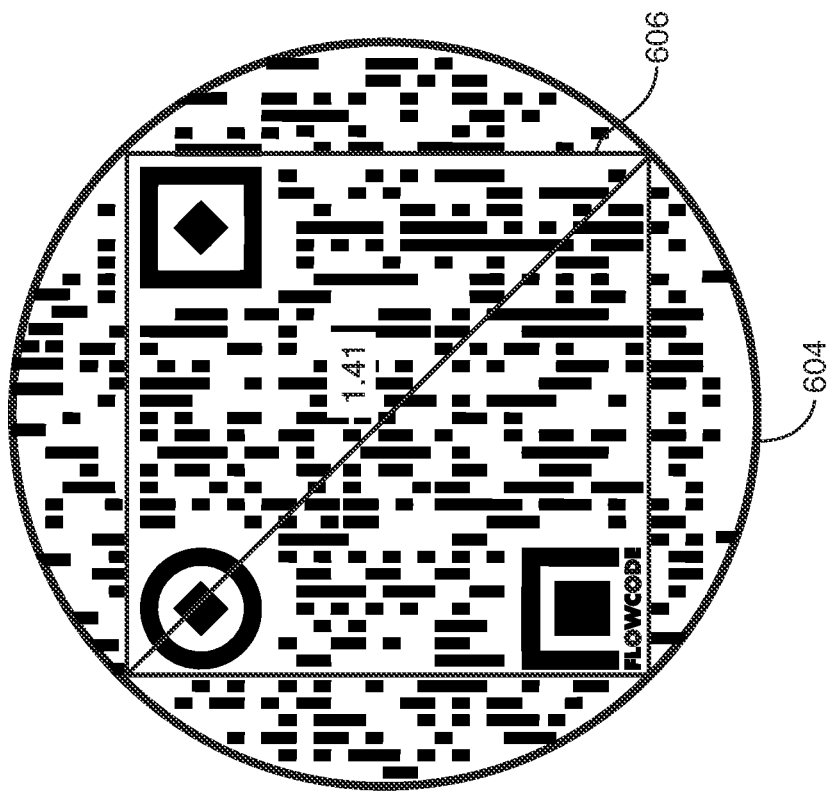
FIG. 6 shows an illustrative diagram of a Flowcode™ in accordance with principles of the disclosure.
Figure 6:
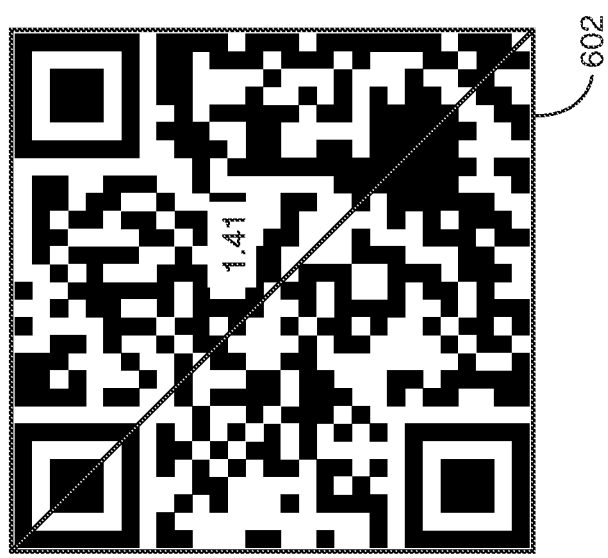

FIG. 6 shows an illustrative diagram of a Flowcode™ 604 alongside a conventional QR code 602 in accordance with principles of the disclosure.

QR code 602 is shown with sides of one unit of length. The diagonal across the square in QR code 602 measure 1.41 units. The area within QR code 602 is 1 square unit.

The outer boundary of Flowcode™ 604 is shown as circumscribing an area 606 corresponding to the area within QR code 602. The area of Flowcode™ is equal to ($\pi \times (R=1.41/2)^2$), which is equal to 1.56 square units.

It should be noted that because the total area of Flowcode™ 604 will be 1.56 square units the area within Flowcode™ 604 and outside of area 706 will equal 0.56 square units—an increase over the area of QR code 602 of 56%. Some embodiments according to the current disclosure leverage this extra 0.56 square units of the scannable area, and the currently unused pixels contained therein, to store additional, preferably scannable, information.

Figure 7:
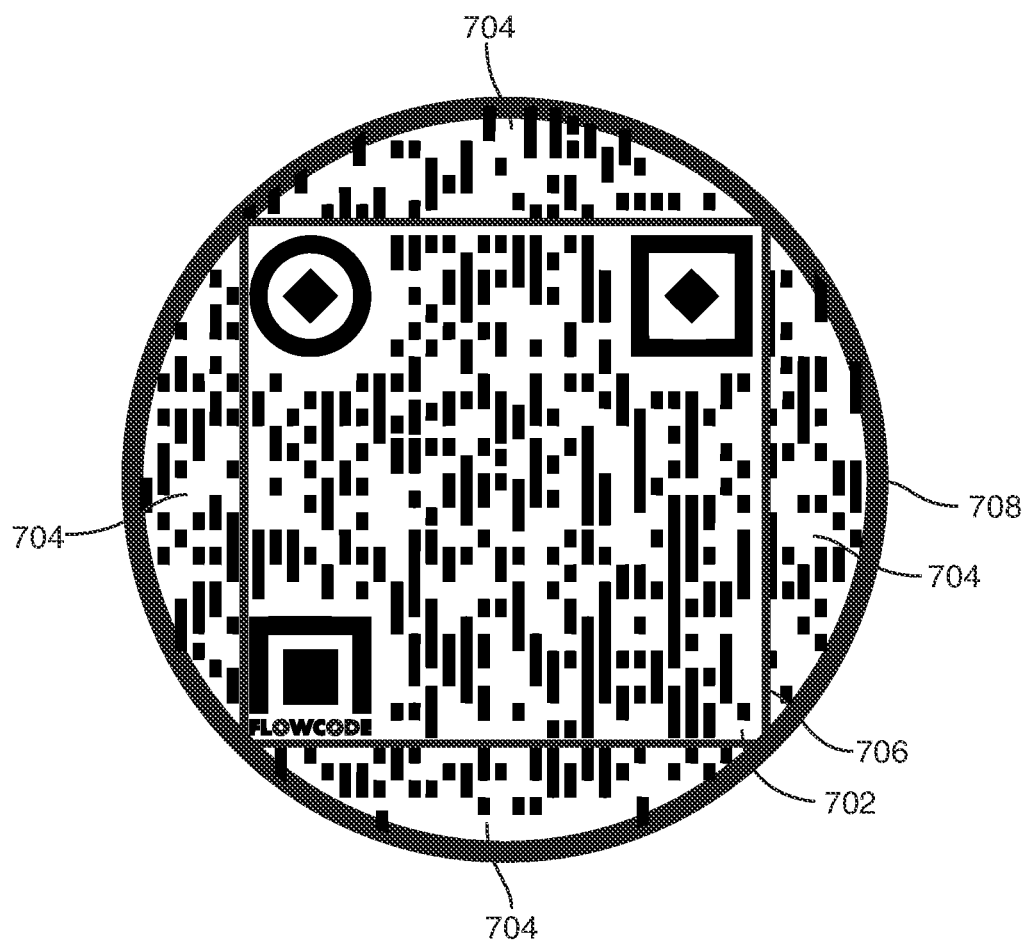
FIG. 7 shows an illustrative diagram of a Flowcode™ in accordance with principles of the disclosure.

FIG. 7 shows an illustrative diagram of a Flowcode™ 708 in accordance with principles of the disclosure. Flowcode™ 708 preferably includes code region 702, as circumscribed by square 706. It should be noted that code region 702 preferably is shown with conventional Flowcode™ 708 size pixels. However, other size pixels are also possible for use with certain embodiments and certain scanning protocols according to the systems and methods of the disclosure. Flowcode™ 708 also includes external code regions 704. These external code regions represent an additional, heretofore unrealized, opportunity with respect to increasing scannable information, improving efficiency of code retrieval and increasing usable code area. To reiterate, rim 708 may, itself, form a code area such that information can be written in the rim line itself. Accordingly, the QR pattern can be within rim 708 such that rim 708 forms an additional area of code.

Figure 8:
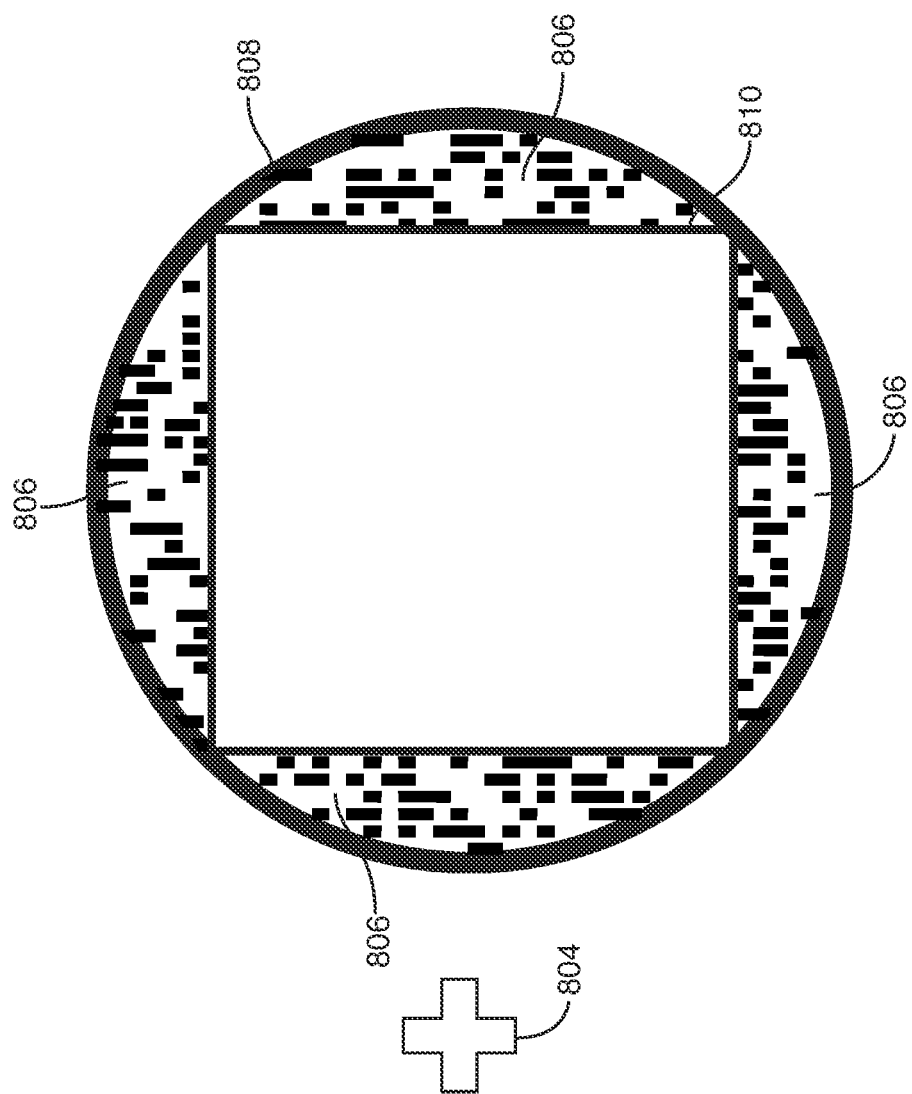
FIG. 8 shows an illustrative diagram of a deconstructed Flowcode™ in accordance with principles of the disclosure.
Figure 8:
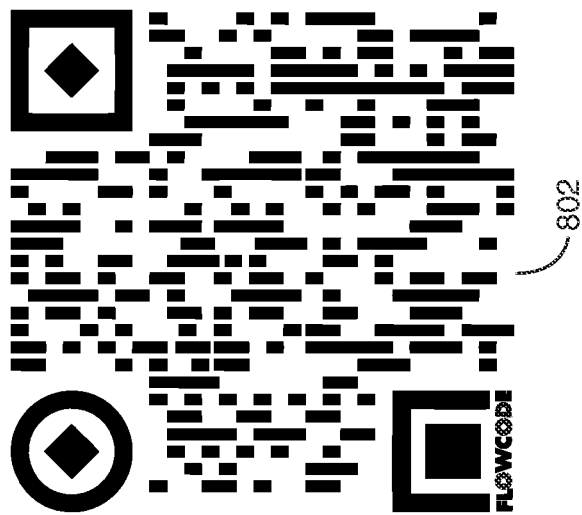

FIG. 8 shows an illustrative diagram of a deconstructed Flowcode™ in accordance with principles of the disclosure. Deconstructed Flowcode™ preferably includes primary code region 802+804 external code regions 806. It should be noted that embodiments according to the invention preferably include an algorithm for implementation of scanning algorithms using a scanner. The algorithm(s) are preferably configured to interpret and process the instructions found in the pixels that are located in primary or internal code regions 802 and external code regions 806. The algorithm may also be preferably configured to interpret and process the logic found in the pixels that are located in a rim 808 that bounds the external portion of external code regions 806. The algorithm(s) may also be preferably configured to interpret and process the logic (which is embedded as machine-readable code) found in the pixels that are located in square 810. It should be noted that, while five code regions are shown in FIG. 8, this number of code regions is merely exemplary and any other suitable number of code regions is within the scope of the disclosure. In some embodiments, any code region could be either subdivided or used with different logic patterns throughout the additional region. This flexible adaption of different code regions could preferably be used to take advantage of any pixel combination. Each pixel, or group of pixels, could be used multiple times and/or in multiple logic patterns.

In certain embodiments, the algorithm may also be preferably configured to interpret and process, preferably simultaneously, two or more of the logic constructs found in the pixels that are located in external code regions 806, the logic constructs found in the pixels that are located within rim 808 and the logic constructs found in the pixels that may be located within square 810. In such embodiments, a scanner with suitable logic embedded therein, could preferably retrieve two or more sets of instructions preferably simultaneously.

Figure 9:
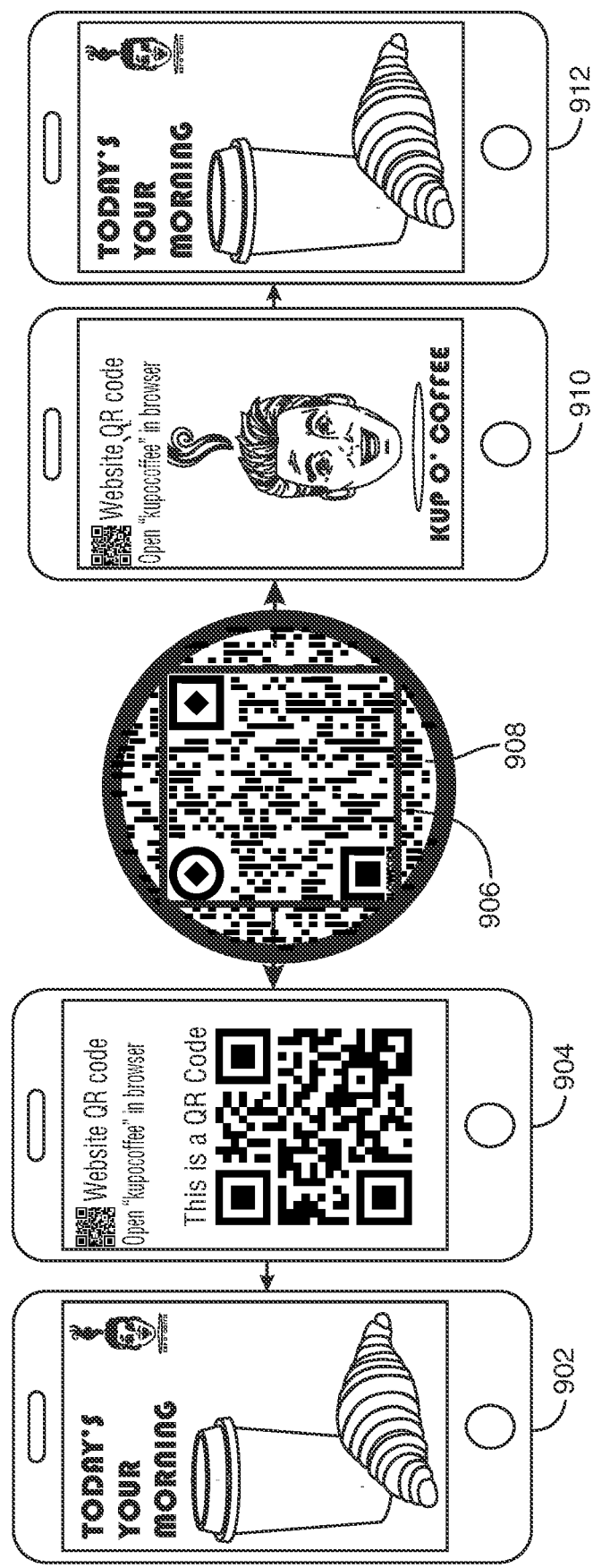
FIG. 9 shows another illustrative diagram of a Flowcode™ dual experience in accordance with principles of the disclosure.

FIG. 9 shows an illustrative diagram of a Flowcode™ dual experience in accordance with principles of the disclosure. FIG. 9 shows a first mobile device screen 902, a second screen 904, a third screen 910 and a fourth screen 912. Flowcode™ is formed from internal code region 906 and external code region 908.

In certain embodiments, internal code region 906, when scanned and processed, preferably triggers display of second screen 904 which, in response to a user selection or an automatic transfer, is capable of navigating a user to a website 912 entitled "Today's Your Morning." Internal code region 906 may preferably be scanned using a conventional machine-readable optical label scanner (not shown). Preferably, the conventional machine-readable optical label scanner does not require any custom code to scan and process internal code regions 906. Second screen 904 preferably shows the internal code region 906 as retrieved. In some embodiments, second screen 904 could preferably navigate a user directly to website 912, independent of showing the user second screen 904.

External code regions 908, when scanned and processed, preferably directly obtains third screen 910 which, in response to a user selection or an automatic transfer, navigates a user to website 912 entitled "Today's Your Morning."

Internal code region 908 may preferably be scanned using a code scanner embodied in the form of a custom-configured mobile device according to the embodiments. Such a code scanner preferably is enabled, in certain embodiments, to retrieve information exclusively from external code regions 908. In alternative embodiments, such a custom scanner according to the invention may be enabled to scan and process internal code regions 906 together with external code regions 908.

It should be noted that all the examples shown herein are by way of example and are not intended to limit the disclosure other than by the claims recited below.

Figure 10:
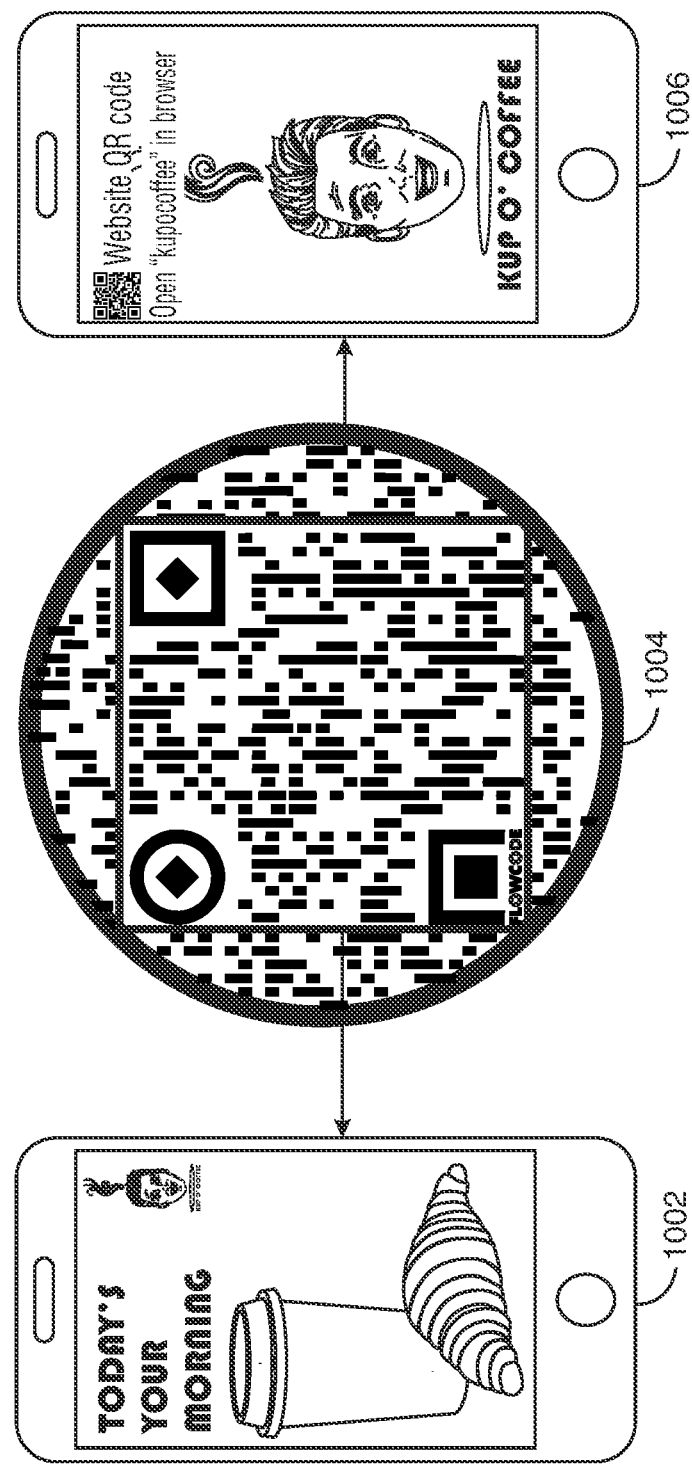
FIG. 10 shows an illustrative diagram of a condensed Flowcode™ dual experience in accordance with principles of the disclosure.

FIG. 10 shows an illustrative diagram of a condensed Flowcode™ dual experience in accordance with principles of the disclosure. FIG. 10 shows a first website 1002 which may be retrieved by a conventional machine-readable optical label scanner in response to scanning Flowcode™ 1004. FIG. 10 shows a second website 1006 which may be retrieved by a customized Flowcode™ scanner in response to scanning Flowcode™ 1004. It should be noted that such a customized Flowcode™ scanner may be configured to retrieve information from one or more of the external regions of Flowcode™ 1004. In certain embodiments, a customized Flowcode™ scanner may be configured to retrieve information from one or more of the external regions of Flowcode™ 1004 in combination with information retrieved from the internal region of Flowcode™ 1004.

Figure 11:
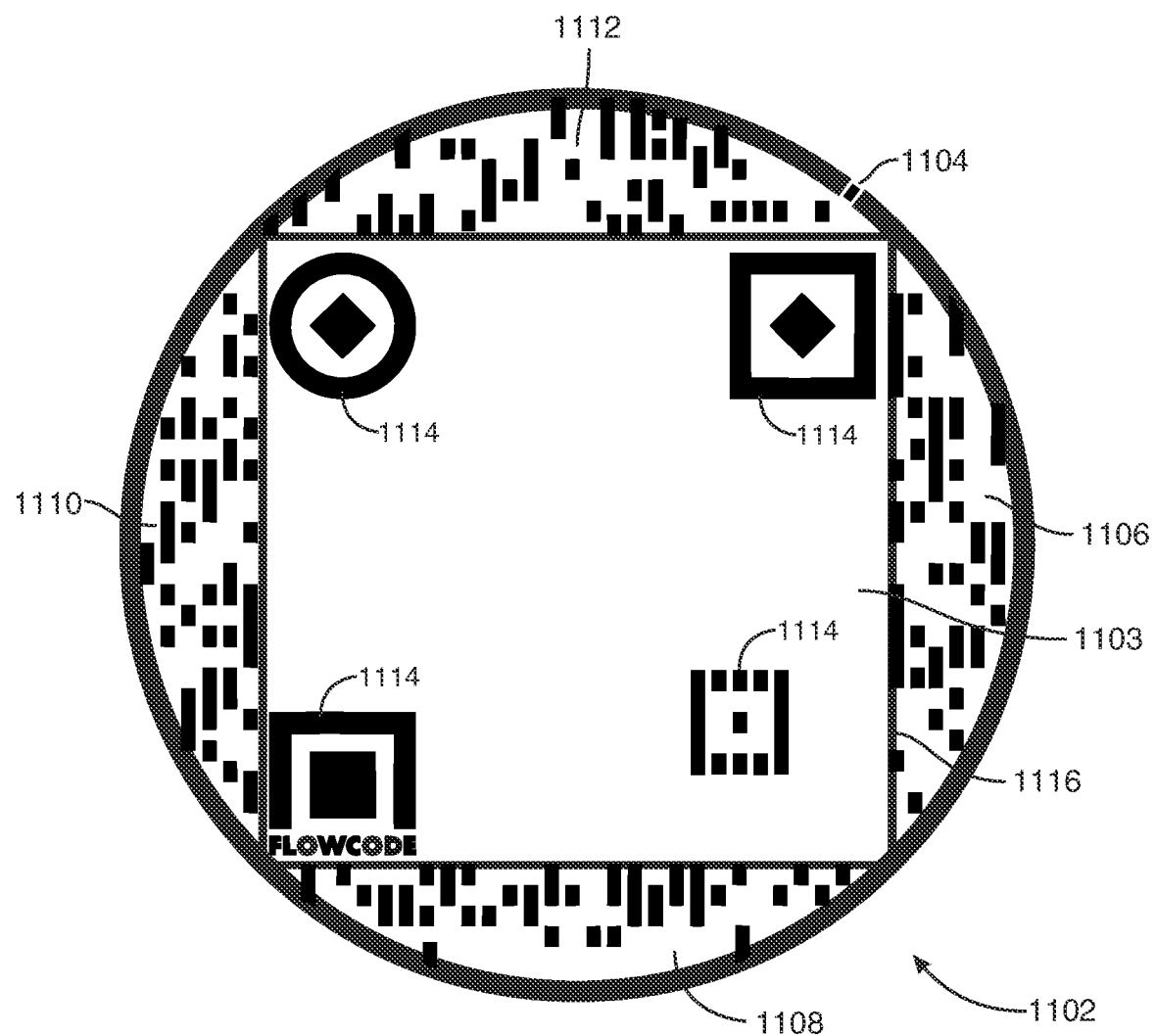
FIG. 11 shows only external regions of a Flowcode™ according to the principles of the disclosure.

FIG. 11 shows just external regions 1106, 1108, 1110 and 1112 of a Flowcode™ 1102 according to the principles of the disclosure.

FIG. 11 also shows "eyes" 1114, otherwise known as position markers. Position markers may be found at a top left, top right, and bottom left of the machine-readable optical label. Position markers may be defined based on a pattern of light/dark modules. For example, a position marker may be spaced apart from the data zone by a border of light modules. The position marker may include an outer border of dark modules. The outer border may surround an inner border of light modules. The inner border of light modules may surround a core of dark modules. A position marker as may be designed to include a pattern of modules that is unlikely to appear elsewhere within the machine-readable optical label.

Each position marker may be linked to another position marker by a timing pattern. An illustrative timing pattern may include a horizontal line of alternating light/dark modules. An illustrative timing pattern may include a vertical line of alternating light/dark modules. Each line of alternating light/dark modules may start and end with a dark module.

The position detection pattern may include an alignment pattern. An alignment pattern may overlap a timing pattern. The alignment pattern may include one or more alignment markers. An illustrative alignment marker may include an outer border of dark modules surrounding an inner border of light modules and a single dark module in the center of the marker.

The alignment pattern may allow a scanning device to determine an orientation of the machine-readable optical label and/or Flowcode™. The alignment pattern may improve scanning speed of the code. The alignment pattern may include markers or a pattern that allows a scanning device to orient the code despite displacement of modules due to distortion. For example, the alignment pattern may allow a device to scan codes applied to a curved surface. Generally, a larger code will include more alignment patterns than a smaller code. Size of a code may be defined based on a number of modules included in the code.

In the Flowcode™ shown in FIG. 11, the eyes may act to orient the customized scanner to retrieve the information only in internal region 1103, only in the external regions 1106, 1108, 1110 and 1112, or in both internal region 1103 and external regions 1106, 1108, 1110 and 1112. It should be noted that while four external regions are shown in FIG. 11, embodiments of the present disclosure contemplate any suitable number of discrete code regions.

In certain embodiments, the scanner may be configured to retrieve information from one or both of border zones 1104 and 1116.

In some embodiments, the scanner may be configured to retrieve information from one or more of border zones 1114, 1116, and external regions 1106, 1108, 1110, 1112 and/or internal region 1103.

In certain embodiments, one or more of border zones 1104 and 1106 may act as environmental zones. The environmental zone may include a buffer of light modules that surround a data zone and associated position detection patterns. The buffer may allow a scanning device to distinguish the data zone from its surrounding environment zone. An illustrative buffer may be four light modules wide, or more or less than four light modules wide. It should be noted that, in certain embodiments set forth herein—i.e., when border zones 1104 and 1106 are include scannable code—the environmental zones should preferably include sufficient area to accommodate environmental zones as well as areas for readable code information.

While Flowcode™ 1102 is shown in circular format, with one or more of border zones 1114, 1116, and external regions 1106, 1108, 1110, 1112 and/or internal region 1102, it should be noted that a Flowcode™ or other machine-readable optical label according to the disclosure does not have to be round. In fact, a Flowcode™ or other machine-readable optical label according to the disclosure can be shapes other than circular.

Moreover, preferably any suitable area—not just border zones 1114, 1116, and external regions 1106, 1108, 1110, 1112, can be leveraged to incorporate additional scannable areas. Preferably any adjacent area, which can be scanned simultaneously with, or separate from, the Flowcode™ or machine-readable optical label can be leveraged to provide additional scannable area for use in providing an optical label according to the disclosure.

A software engine, which may be used to create the code, may generate one or more of the above-described environmental zones for the code. The software engine may generate, for integrating into the final code, the buffer surrounding the internal regions of the code and the position detection patterns. The software engine may generate modules for an environmental zone surrounding the data zone. The environmental zone of a code may include marks or designs that are not intended to be interpreted by a scanning device. The appearance of a standard QR code may be defined by one or more standards published by the International Organization for Standardization (ISO) of Geneva, Switzerland. Illustrative standards published by the ISO include ISO/IEC 18004: 2015 and ISO/IEC 24778:2008 which are hereby incorporated herein by reference in their entireties.

The software engine may generate a data zone for the code.

Figure 12:
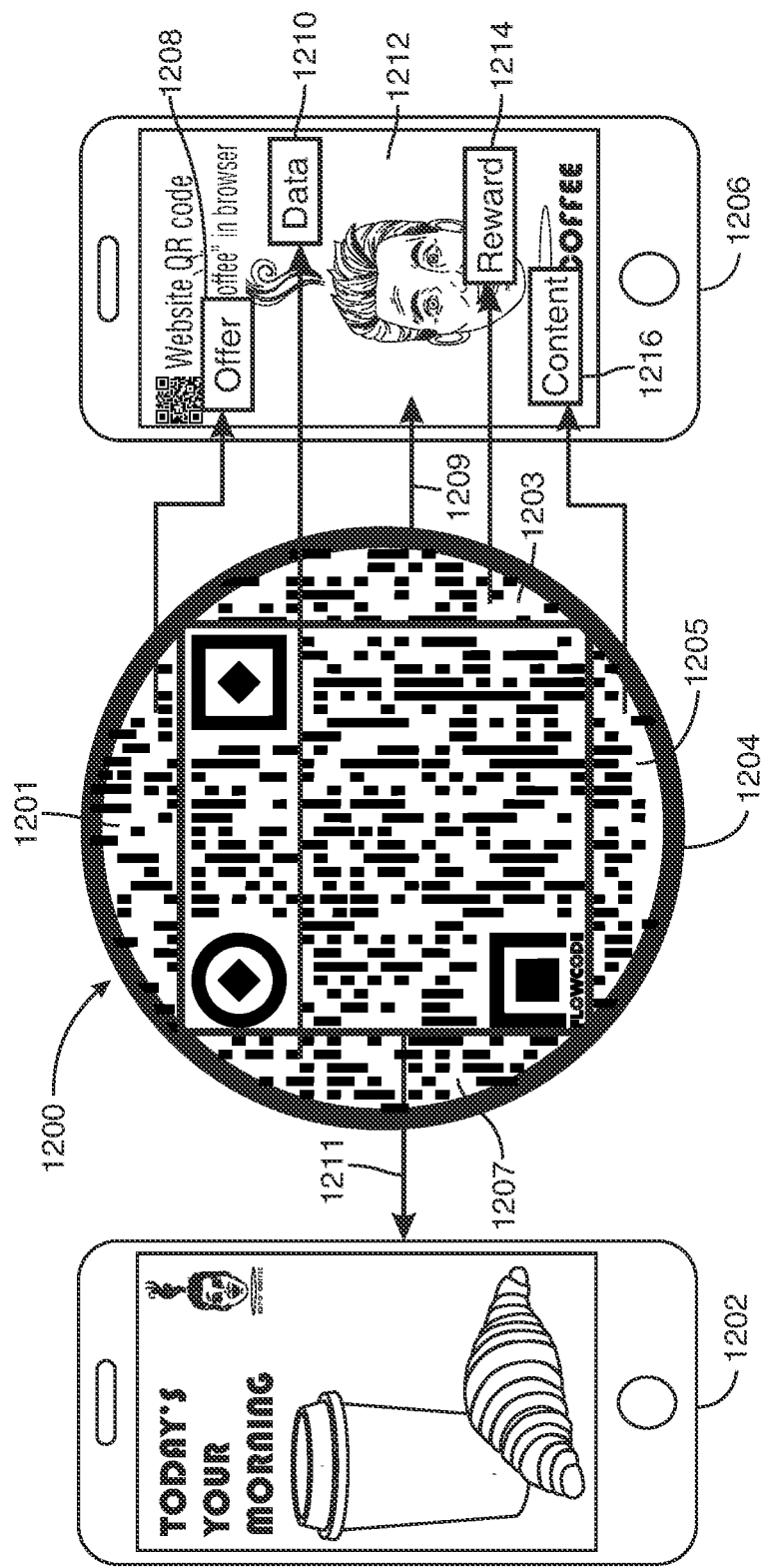
FIG. 12 shows yet another illustrative diagram of a reconstructed Flowcode™ in accordance with principles of the disclosure.

FIG. 12 shows yet another illustrative diagram of a reconstructed Flowcode™ 1200, as shown on devices 1202 and 1206, in accordance with principles of the disclosure. FIG. 12 shows retrieving and processing information from the external regions of Flowcode™ 1200. A first region 1201 may preferably provide information related to an offer 1208 associated with a website 1212. A second region 1203 may preferably provide information related to a reward 1214 related to website 1212. A third region 1205 may preferably provide information related to content 1216 of website 1212. A fourth region 1207 may preferably provide information related to data 1210 of website 1212.

It should be noted that FIG. 12 also shows that Flowcode™ 1200 may be further customized to provide information in rim 1204 and/or internal region 1211. To the extent that internal region 1211 comprises code that may be retrieved by a conventional machine-readable optical label scanner, internal region 1211 may retrieve a website 1202 or other data that is different from website 1212.

Figure 13A:
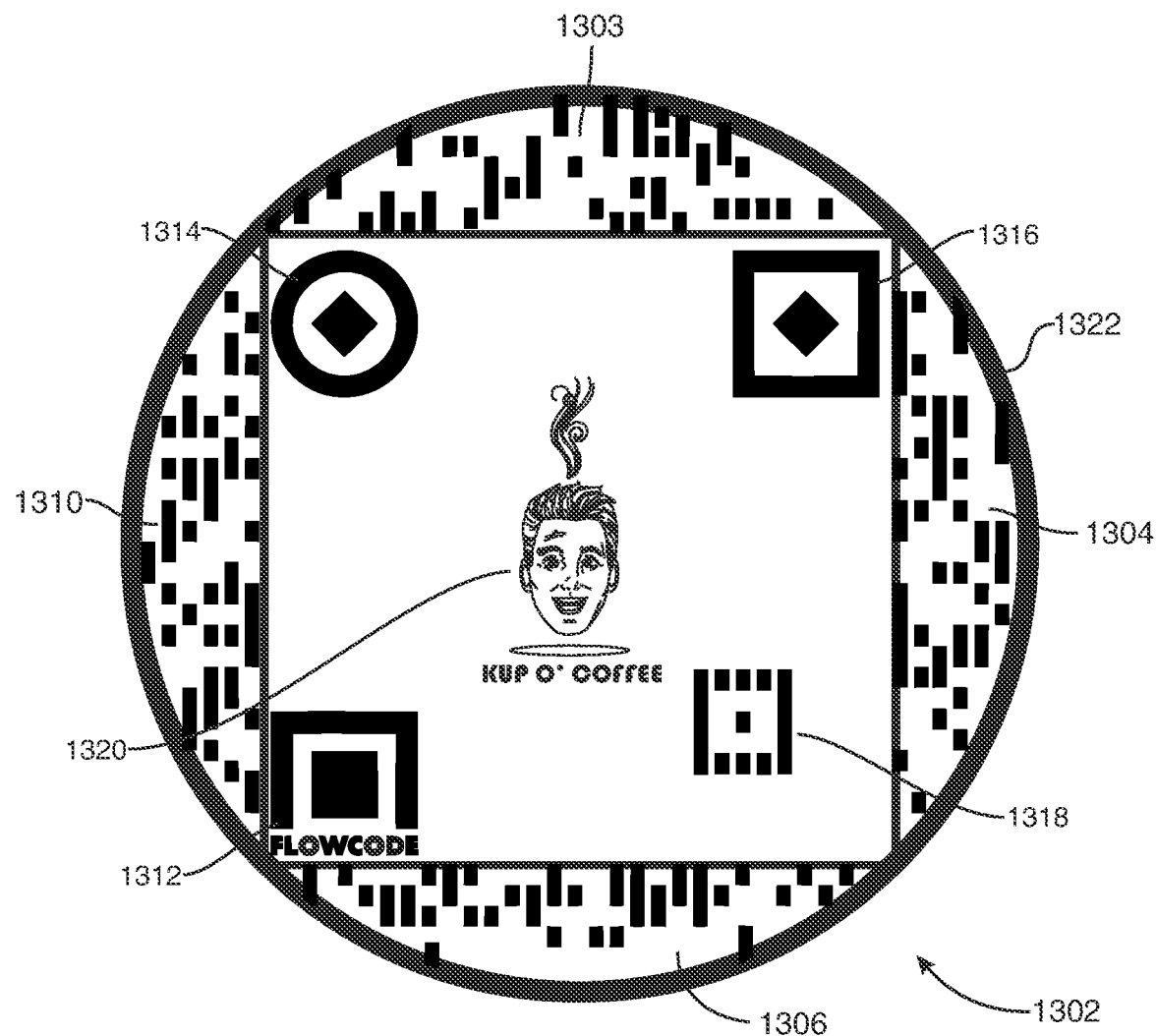
FIGS. 13A-C show illustrative diagrams of a Flowcode™ in accordance with the principles of the disclosure.

FIG. 13A shows an illustrative diagram of a Flowcode™ in accordance with the principles of the invention. Flowcode™ 1302 shows scannable external regions 1303, 1304, 1306 and 1310. Flowcode™ 1302 also shows orientation markers 1312, 1314, 1316, and 1318. In addition, Flowcode™ 1302 shows an internal region 1320 that is occupied, primarily, by typically non-scannable brand information. Flowcode™ 1302 also shows rim 1322, which can contain scannable information as well. In certain embodiments, orientation markers 1312-1318, as set forth herein may be leveraged to enable the scanner to read external regions 1302, 1304, 1306 and 1308.

Figure 13B:
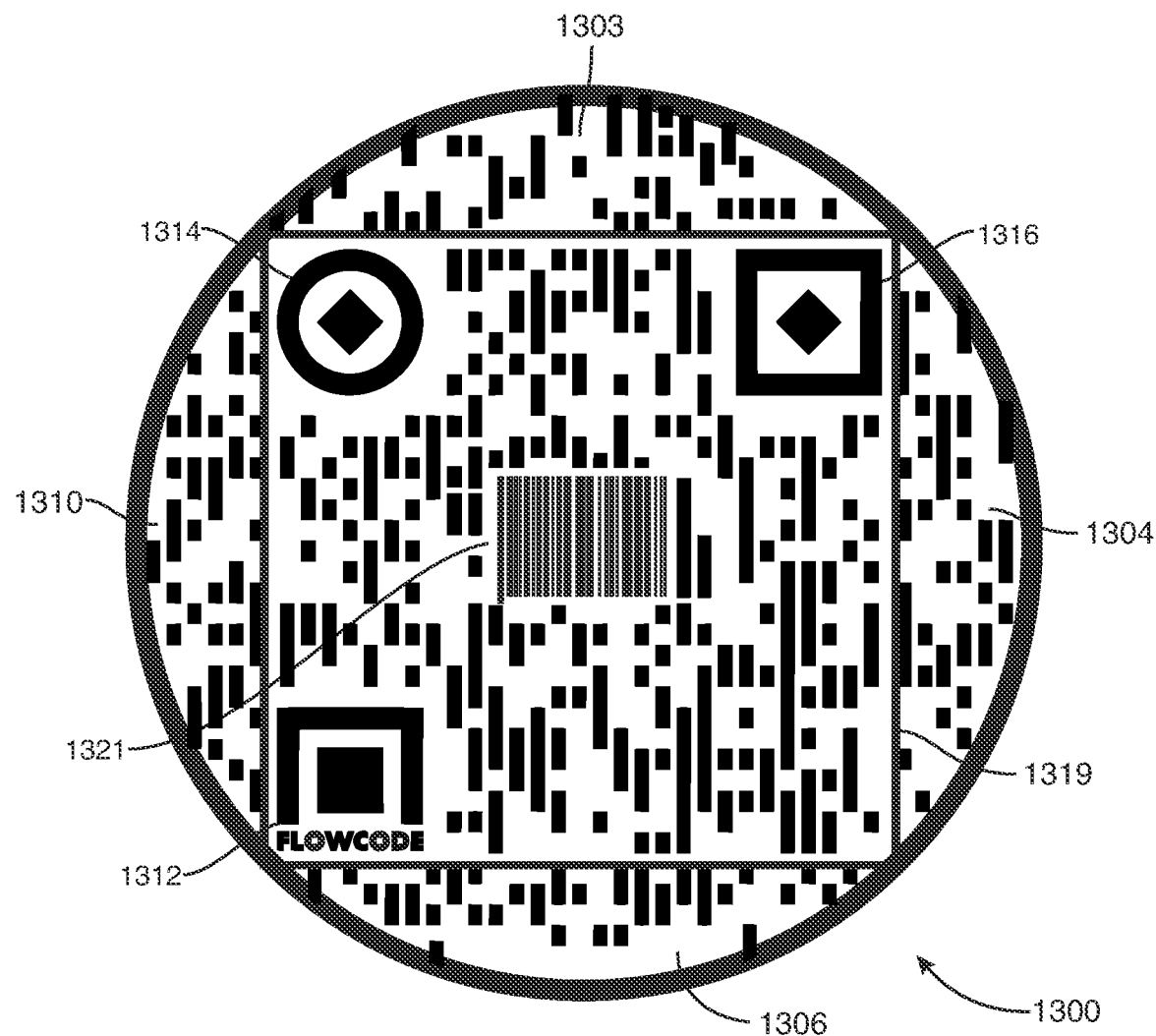

FIG. 13B shows another illustrative diagram of a Flowcode™ 1300 in accordance with the principles of the invention. Flowcode™ 1300 shows scannable external regions 1303, 1304, 1306 and 1310. Flowcode™ 1300 shows optional orientation markers 1312, 1314, and 1316. It should be noted that these markers are optional and not required in all embodiments. In addition, Flowcode™ 1300 shows an internal region 1320 that is occupied by a unique ID. The unique ID may be a linear barcode or a two-dimensional matrix barcode. Internal region 1320 may include any suitable label such as a suitable machine-readable optical label. It should be noted that the size of internal region 1320 may be limited by the error correction level of the machine-readable optical label at least because the space available for data to be encoded in primary scanning region 1319 will be limited by the inclusion therein of internal region 1320.

It should be noted as well that a unique ID (shown only with respect to internal region 1320) may also, in certain embodiments, be used to fill external regions 1303, 1304, 1306 and 1310 with readable code information.

Figure 13C:
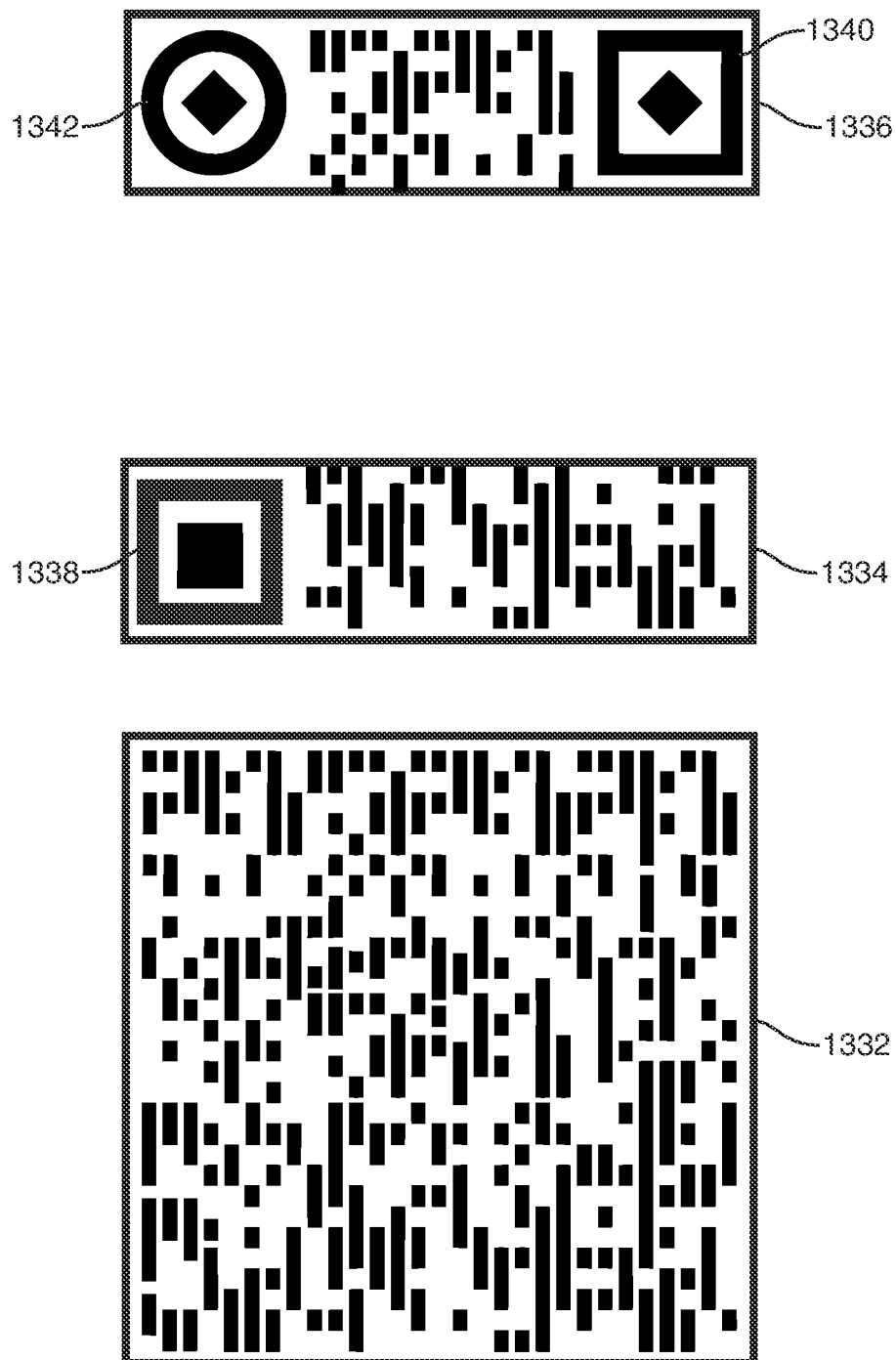

FIG. 13C shows yet another illustrative diagram of a Flowcode™ in accordance with the principles of the invention. QR code 1332 preferably includes a primary region of code. Code area 1334 may include a secondary code region. Code area 1336 may include a third code region 1336.

It should be noted that, in this embodiment, primary code region 1332 is devoid of markers 1338-1342. Secondary code region 1334, on the other hand, includes orientation markers 1338 while third code region 1336 includes markers 1340 and 1342. The flexible presentation of markers among different code regions, or the lack of orientation markers, are all within the scope of the current disclosure.

Figure 14:
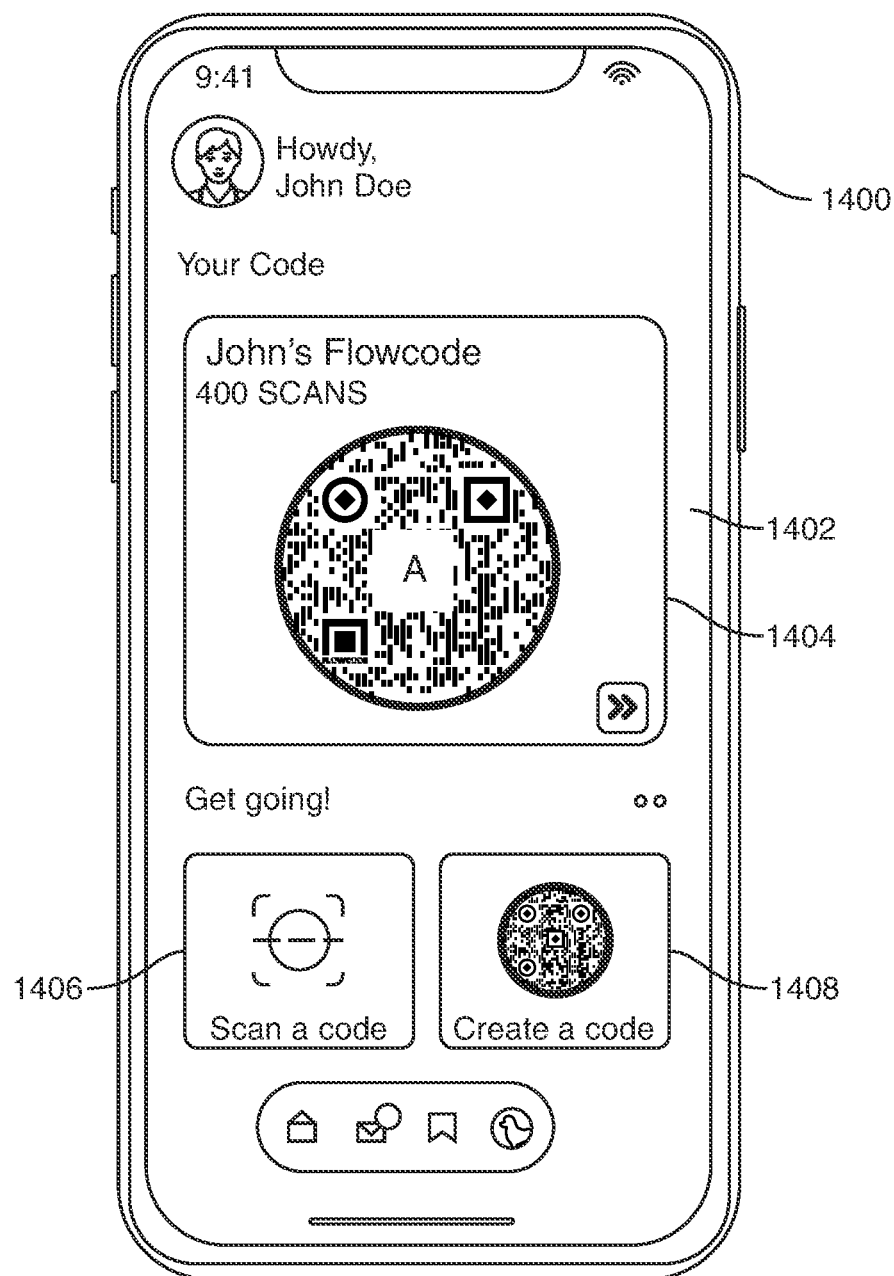
FIG. 14 shows an exemplary Flowcode™ home screen in accordance with the principles of the disclosure.

FIG. 14 shows a mobile device 1400. Mobile device 1400 displays exemplary Flowcode™ home screen 1402. Home screen 1402 includes a user's selectable (referred to herein in the alternative as "clickable") personal Flowcode™ 1404. Such a personal Flowcode™ 1404 may, in certain embodiments, direct a user to a user homepage associated with the selectable Flowcode™ 1404.

Home screen 1402 is shown as having been associated with a single user. Home screen preferably enables a user to read and upload a code 1406 and/or create a code 1408.

It should be noted that the user's personal Flowcode™ 1404 may enable a user to access a library of decoded and selectable codes. In certain embodiments, user's personal Flowcode™ 1404 can be shared with others by having others scan the code, click the code, message the code, otherwise contact the code by electronic transmission, or by some other suitable communication process. In some embodiments, other users may be provided access to a user's library of decoded and selectable codes.

Figure 15:
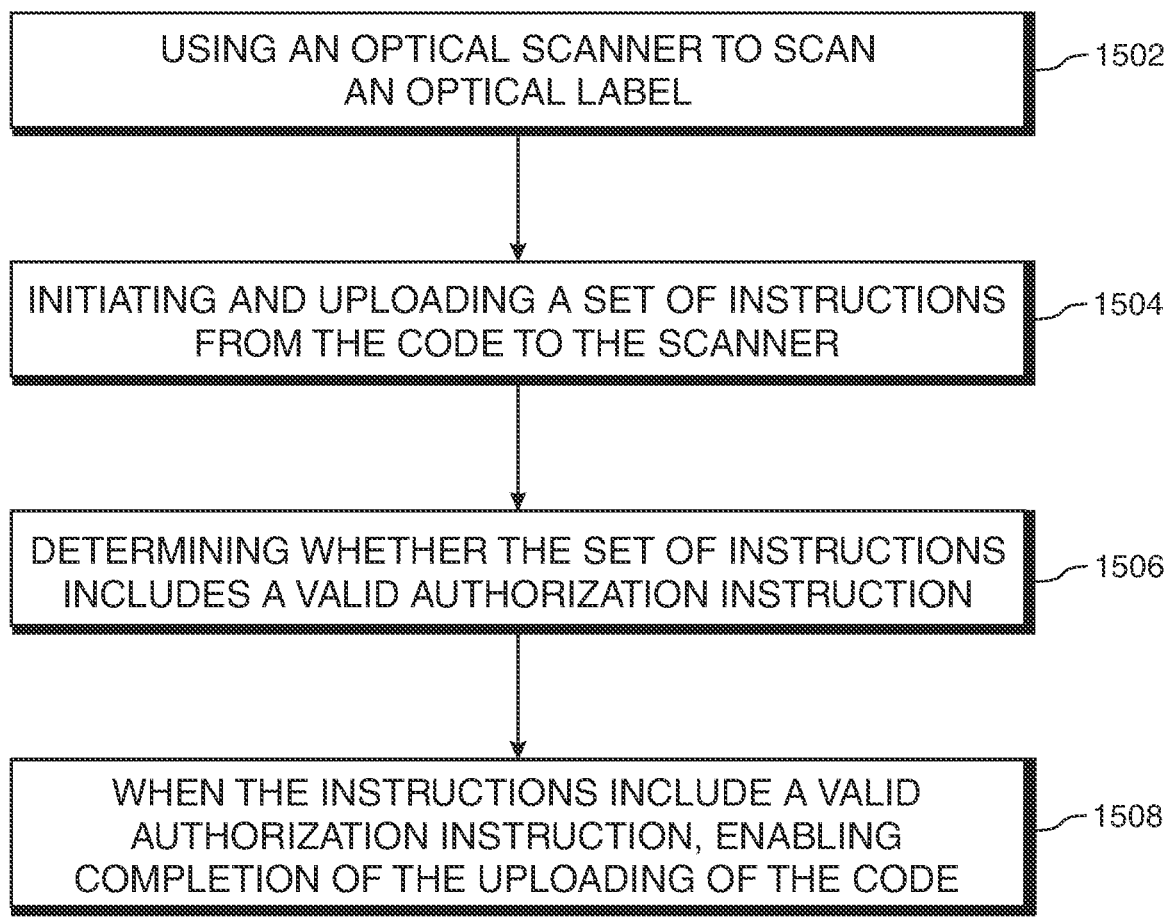
FIG. 15 shows an illustrative flow diagram of a method in accordance with the disclosure.

FIG. 15 shows an illustrative flow diagram of a method in accordance with the disclosure. Step 1502 shows using an optical scanner to scan an optical label. Step 1504 shows initiating uploading of a set of instructions the optical label to the scanner.

At step 1506, the scanner determines whether the uploaded set of instructions includes a valid authorization instruction. Such an authorization instruction may indicate that the code was "signed"—i.e., authored—by a pre-determined entity.

At step 1508, the method indicates that, in response to determining that the instructions include a valid authorization instruction, the method completes of the loading of the instructions in the code to the scanner, and the subsequent performance of instructions associated with the completion of the loading of the instructions in the code.

It should be noted that in certain embodiments, a software developer's kit ("SDK") may be provided in accordance with the disclosure set forth herein. Such an SDK may preferably include a user-accessible module for adding to optical scanner configuration code. Such an SDK module may preferably enable an application author to write an application for generating optical labels that include a unique signature. The unique signature may preferably enable the scanner application to determine whether the scanned optical label was generated by a pre-determined entity. In some embodiments, such an application may limit a scanner to processing only optical labels by one or more pre-determined entities.

In some embodiments involving the SDK and/or the API it should be noted that applications for scanning optical labels that include a unique signature may preferably be configured to transmit the scanning information—the scanned data, the scan time, the scan location and/or context of a scan of a machine-readable optical label—to a centralized server. At the centralized server, the scanning information may preferably be indexed and analyzed to determine trends involving user's behavior. Such retrieval, consolidation and analysis of scanning information should all preferably comply with relevant information privacy regulations.

In some embodiments, an application programming interface ("API") may be used to access the validation algorithm set forth in FIG. 15. For example, if a user is building an application for QR code using an API according to the disclosure, an app may embed a unique signature into a QR code according to such embodiments. The unique signature can preferably include information identifying the entity associated with the app and/or the creator of the scanned code. Such identity information preferably can be used by an app that includes a validation algorithm. A scanner that includes the app may verify, at the time of retrieval, the identity of the entity that generated a scanned optical label.

One method of confirming a unique signature embedded in an optical label involves using cryptographic codes. For example, an optical lable generator may embed a private cryptographic key in a generated label. This embedded private key may be the unique signature of the optical label.

The optical label including the private cryptographic code may be configured to be executed by an optical scanner.

For example, the scanner may scan the optical label. The optical label may include code that may be signed, on behalf of the entity associated with generating the label, using the private cryptographic key.

Access to the private cryptographic key may be controlled by the creator or entity associated with generating the label. To increase security, such a private cryptographic key may be signed in a pre-determined error detection code level such that the private cryptographic key is not visible to the human eye.

A customized scanning application that may be downloaded to, or resident on, the scanner may include a public cryptographic key. The public cryptographic key may include a 32-byte key.

The customized scanning application may be customized at least because it is equipped with the public cryptographic key. The public cryptographic key may be used to validate the private cryptographic key within the optical label and—thereby confirm a valid authorization instruction associated with the scanned optical label.

To reiterate, a scanned optical label may be signed, preferably using a private cryptographic key, by the creator and/or generator of the label. The signing the label may leverage an SDK or an API to integrate the private key into the generated label. The scanner, using the public cryptographic key, may validate the scanned label to confirm the valid authorization instruction.

Figure 16:
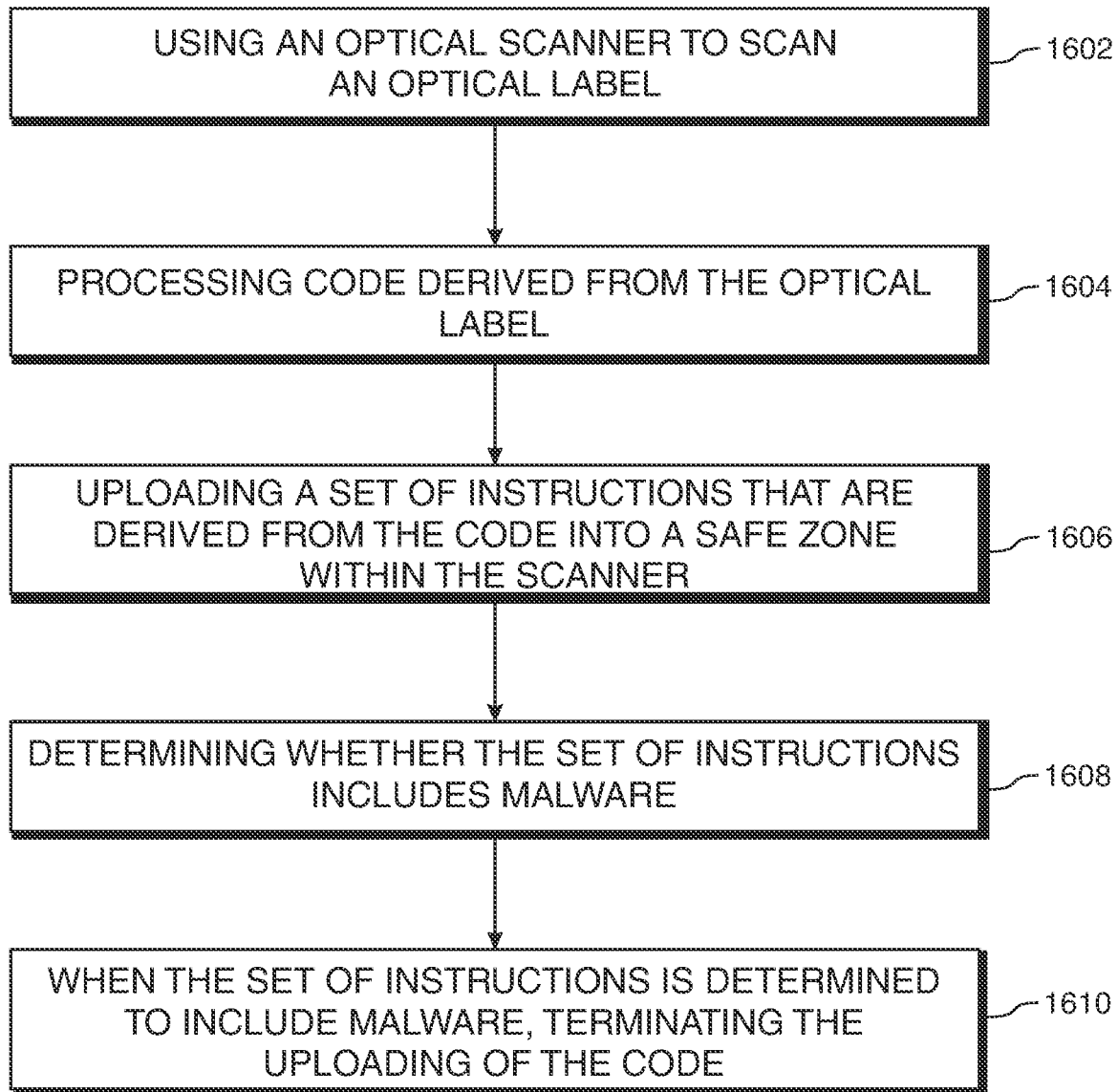
FIG. 16 shows another illustrative flow diagram of a method in accordance with the disclosure.

FIG. 16 shows another illustrative flow diagram of a method in accordance with the disclosure. Similar to the method shown in FIG. 15, step 1602 shows using an optical scanner to scan an optical label.

Step 1604 shows processing information derived (or otherwise extracted) from the scanned optical label. At step 1606, the method shows uploading a set of executable instructions that are derived (or otherwise extracted) from the scanned label. Prior to taking action based on the instructions, the instructions may be isolated in a safe zone—i.e., a zone that is separated and secured from interacting with vulnerable portions of the scanner.

Such a safe zone may preferably be a memory location within the scanner where the instructions can be analyzed. For example, if the instructions direct a scanner to a pre-determined website, the website can be reviewed to determine whether it is a trusted website. This is shown at step 1608, which states, generally, determining whether the instructions include malware. Such malware may direct the scanner to the afore-mentioned untrusted website or the instructions itself may include damaging information, such as, for example, a computer virus.

At step 1610, the scanner can, in response to a determination that the instructions include malware, preferably terminate uploading of the code. This termination preferably occurs while the code remains isolated in the safe zone, and before the scanner takes actions based on executing the instructions.

Figure 17:
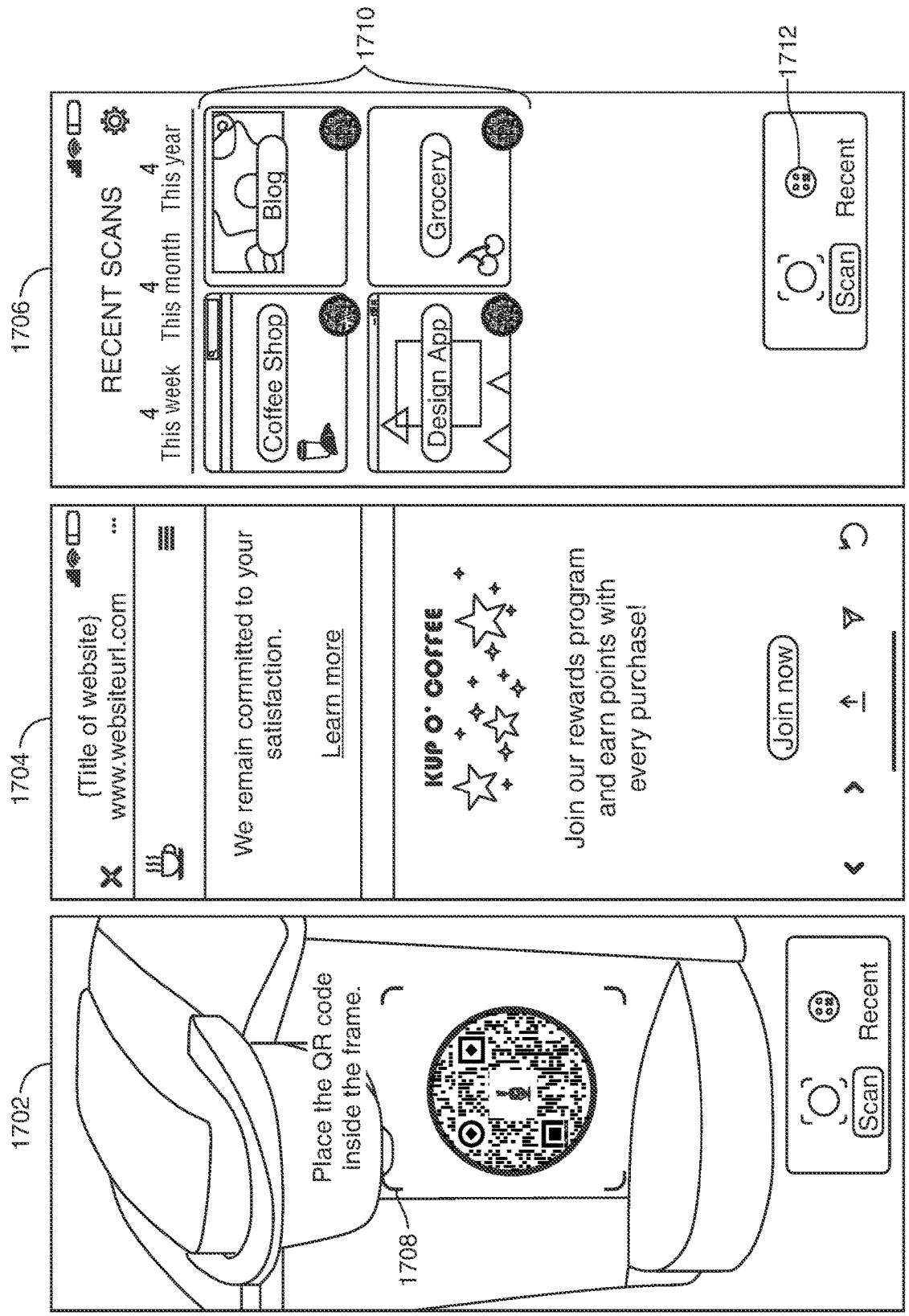
FIG. 17 shows a series of Flowcode™ screens in accordance with the principles of the disclosure.

FIG. 17 shows a series of Flowcode™ screens 1702, 1704 and 1706 in accordance with the principles of the disclosure. Screens 1702, 1704 and 1706 preferably indicate an exemplary set of scanning according to an application in accordance with the disclosure set forth herein.

Screen 1702 preferably shows that a Flowcode™ or another machine-readable optical label can be scanned with a customized scanner. Such a scanning can preferably trigger a rewards page, such as the page shown on screen 1704. In addition, screen 1706 shows that codes, once selected or clicked, can be stored, organized and displayed. It should be noted that the codes, once selected or clicked, can preferably be immediately checked for malware which would otherwise be triggered by clicking or selecting the QR code.

In the menu shown at 1710, such QR code can be represented by a picture or other associated visual indicator. In addition, at 1712, screen shows that the library may have a "recent" access button which enables users to retrieve a system-set or user-defined number of most recently retrieved codes.

Figure 18:
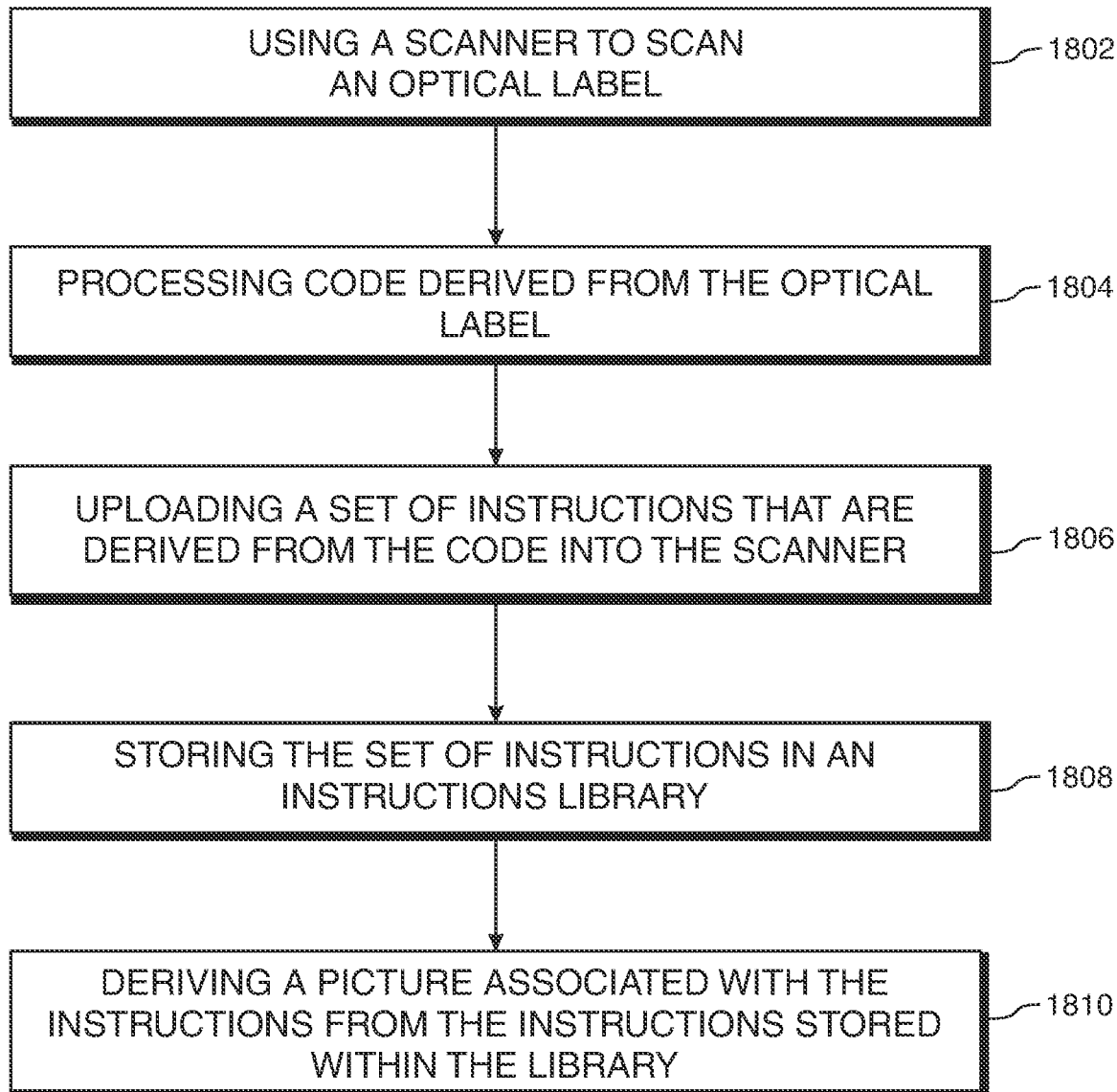
FIG. 18 shows yet another illustrative flow diagram of a method in accordance with the disclosure.

FIG. 18 shows yet another illustrative flow diagram of a method in accordance with the disclosure. Similar to the method shown in FIGS. 15 and 16, step 1802 shows using an optical scanner to scan an optical label.

Step 1804 shows processing code derived from the optical label. At step 1806, the method shows uploading a set of instructions that are derived (or otherwise extracted) from the label into the scanner.

Step 1808 shows storing the set of instructions in an instructions library. At step 1810, the method preferably derives a picture associated with the instructions from the instructions that are stored within the library. It should be noted that the picture may preferably be derived from instructions either before or after the instructions are stored within the library. Such a library may be indexed to provide a user an easily accessible list of QR codes which the user has recently accessed.

Thus, a MULTIPLEXED QUICK RESPONSE ("QR") CODE EXPERIENCE DERIVATION is provided. Persons skilled in the art will appreciate that the present invention can be practiced by other than the described embodiments, which are presented for purposes of illustration rather than of limitation. The present invention is limited only by the claims that follow.

What is claimed is:

1. A method for processing a scanned optical label, said optical label comprising a primary optical label machine-readable code region and at least one secondary optical label machine-readable code region, the method comprising:
   activating a scanning application on an optical label scanner;
   retrieving information, using the scanning application activated on the optical label scanner, from the primary optical label machine-readable code region; and
   retrieving information, using the scanning application activated on the optical label scanner, from the at least one secondary optical label machine-readable code region;
   wherein said primary optical label machine-readable code comprises a magnitude of an area that is greater than a magnitude of an area associated with the secondary optical label machine-readable code region, and wherein said primary optical label machine-readable code region comprises instructions that are different from instructions in the secondary optical label machine-readable code region.

2. The method of claim 1 wherein the magnitude of the area of the primary optical label machine-readable code is greater by at least 30% of the magnitude of the area of the primary optical label machine-readable code than the magnitude of the area of the secondary optical label machine-readable code region.

3. The method of claim 1 wherein the magnitude of the area of the primary optical label machine-readable code is greater by at least 30% than the magnitude of the area of the secondary optical label machine-readable code region.

4. The method of claim 1 wherein the instructions in the primary optical label machine-readable code region direct, in response to a scanning and a processing of the instructions in the primary optical label machine-readable code region, the scanner to a first location and the instructions in the secondary optical label machine-readable code region direct, in response to a scanning and the processing of the instructions in the secondary optical label machine-readable code region, the scanner to a second location.

5. The method of claim 1 wherein the optical label scanner is further configured to execute a third set of instructions, the third set of instructions that is based on the instructions in the primary optical label machine-readable code region in conjunction with the instructions in the secondary optical label machine-readable code region.

6. The method of claim 1 wherein the optical label scanner is further configured to execute a third set of instructions, the third set of instructions that is based on the instructions in the primary optical label machine-readable code region, and is only accessible in conjunction with a private cryptographic key that is derived from the instructions in the secondary optical label machine-readable code region.

7. The method of claim 1 wherein the secondary optical label machine-readable code region is formed from a plurality of discrete regions.

8. The method of claim 7 wherein the plurality of discrete regions substantially surrounds the primary optical label machine-readable code region.

9. The method of claim 1 wherein the primary region substantially surrounds the secondary region.

10. An optical code scanner, said scanner being operated using an algorithm, the scanner configured to:
    scan an optical label, said optical label comprising optical label machine-readable code; and
    using the scanner to process the code stagewise, said stagewise processing of the code comprising:
       in a first stage, initiating uploading a set of instructions from the code to the scanner;
       in a second stage, determining whether the set of instructions comprises a valid authorization instruction within the code; and
       in a third stage, when the set of instructions is determined to comprise the valid authorization instruction, enabling completion of the uploading of the code.

11. An optical code scanner, said scanner being operated using an algorithm, the scanner configured to:
    scan an optical label, said optical label comprising optical label machine-readable code;
    using the scanner to process the code, said processing comprising:
       uploading a set of instructions from the code to a safe zone within the scanner;
       determining whether the set of instructions comprises malware;
       if the set of instructions comprises malware, then terminating the uploading of the code.

12. An optical code scanner, said scanner being operated using an algorithm, the scanner configured to:
    scan an optical label, said optical label comprising an optical label machine-readable code;
    using the scanner to process the code, said processing comprising:
       uploading a set of instructions from the code to the scanner;
       storing the set of instructions in an instructions library; and
       deriving a picture associated with the instructions from the instructions stored within the library.

13. The scanner of claim 12, wherein the scanner is further configured to display a plurality of pictures, each of the pictures corresponding to a set of uploaded instructions stored on the scanner.

14. The scanner of claim 12, wherein each of the plurality of pictures is selectable by a user, and, in response to a selection of a picture, the scanner is configured to execute the uploaded instructions corresponding to the selected picture.

* * * * *